US008826184B2

(12) United States Patent
Kwak et al.

(10) Patent No.: US 8,826,184 B2
(45) Date of Patent: Sep. 2, 2014

(54) MOBILE TERMINAL AND IMAGE DISPLAY CONTROLLING METHOD THEREOF

(75) Inventors: Joonwon Kwak, Seoul (KR); Kisun Lee, Seoul (KR); Jonghwan Kim, Suwon-si (KR); Seonhwi Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 259 days.

(21) Appl. No.: 13/049,784

(22) Filed: Mar. 16, 2011

(65) Prior Publication Data

US 2011/0246877 A1 Oct. 6, 2011

(30) Foreign Application Priority Data

Apr. 5, 2010 (KR) .................. 10-2010-0030759
May 19, 2010 (KR) .................. 10-2010-0046789

(51) Int. Cl.
G06F 3/048 (2013.01)
G06F 3/00 (2006.01)

(52) U.S. Cl.
USPC ............ 715/848; 715/757; 715/850; 715/852

(58) Field of Classification Search
USPC ......... 715/702, 836, 848, 850, 852, 764, 765, 715/778, 783, 788, 792, 794; 345/419, 619, 345/653, 654, 679, 680
See application file for complete search history.

(56) References Cited

U.S. PATENT DOCUMENTS

| | | | |
|---|---|---|---|
| 7,535,486 B2 * | 5/2009 | Motomura et al. ........... | 348/158 |
| 7,889,192 B2 * | 2/2011 | Konya et al. .................. | 345/419 |
| 8,232,990 B2 * | 7/2012 | King et al. .................... | 345/419 |
| 8,451,268 B1 * | 5/2013 | Reisman et al. .............. | 345/419 |
| 2007/0070066 A1 * | 3/2007 | Bakhash ........................ | 345/419 |
| 2009/0150775 A1 * | 6/2009 | Miyazaki et al. ............. | 715/702 |
| 2009/0179914 A1 * | 7/2009 | Dahlke ......................... | 345/619 |
| 2009/0201246 A1 * | 8/2009 | Lee et al. ...................... | 345/156 |
| 2009/0262074 A1 * | 10/2009 | Nasiri et al. .................. | 345/158 |
| 2009/0313584 A1 * | 12/2009 | Kerr et al. ..................... | 715/849 |
| 2010/0064259 A1 * | 3/2010 | Alexanderovitc et al. .... | 715/852 |
| 2010/0115471 A1 * | 5/2010 | Louch et al. .................. | 715/849 |
| 2011/0164029 A1 * | 7/2011 | King et al. .................... | 345/419 |

FOREIGN PATENT DOCUMENTS

| | | |
|---|---|---|
| CN | 1910543 A | 2/2007 |
| CN | 101267574 A | 9/2008 |
| CN | 101299843 A | 11/2008 |
| CN | 101331420 A | 12/2008 |

OTHER PUBLICATIONS

Chinese Office Action dated Nov. 29, 2012 (including English Translation).

* cited by examiner

*Primary Examiner* — Nicholas Augustine
(74) *Attorney, Agent, or Firm* — KED & Associates, LLP

(57) ABSTRACT

A mobile terminal and a method of controlling an image display thereof are disclosed. A display module for a mobile terminal as disclosed herein may include a display for displaying an image that includes one or more objects, a user input interface to receive an input to change the image between a 2D display and a 3D display, and a controller configured to change the displayed image between the 2D display and the 3D display based on the received input. The controller may control the display to sequentially display one or more intermediate images in order to gradually change an extent in which at least one of the one or more objects is perceived to protrude or recede into the display during the change in the displayed image.

29 Claims, 46 Drawing Sheets

(a)

MOBILE TERMINAL AND IMAGE DISPLAY CONTROLLING METHOD THEREOF

CROSS-REFERENCE TO RELATED APPLICATION(S)

This application claims priority under 35 U.S.C. §119 to Korean Application Nos. 10-2010-0030759, filed in Korea on Apr. 5, 2010 and 10-2010-0046789 filed in Korea on May 19, 2010, whose entire disclosure(s) is/are hereby incorporated by reference.

BACKGROUND

1. Field

The present disclosure relates to a mobile terminal, and more particularly, to a mobile terminal and image display controlling method thereof. Although the present disclosure is suitable for a wide scope of applications, it may be particularly suitable for performing both a 2-dimensional and 3-dimensional display of objects.

2. Background

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

Generally, in case of a switching operation of switching 2-dimensional (2D) display to 3-dimensional (3D) display, a terminal capable of performing both of the 2D display and the 3D display is able to display an image 3-dimensionally in a manner that the image has a projected extent (or a recessed extent) corresponding to a completed state of the switching operation. And, in case of performing a switching operation of switching 3D display to 2D display, if the switching operation is completed, the terminal is able to display an image 2-dimensionally.

According to the related art, the mobile terminal does not display an image according to the switching operation between the 2D display and the 3D display in the course of performing the switching operation.

Moreover, only if the switching operation is completed, the mobile terminal displays an image to have a projected or recessed extent according to an executed result of the switching operation. Hence, the related art mobile terminal does not provide a process for a gradual change of the projected or recessed extent of a corresponding image in the course of the switching operation.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

In the following detailed description, reference is made to the accompanying drawing figures which form a part hereof, and which show by way of illustration specific embodiments of the disclosure. It is to be understood by those of ordinary skill in this technological field that other embodiments may be utilized, and structural, electrical, as well as procedural changes may be made without departing from the scope of the present disclosure. Wherever possible, the same reference numbers will be used throughout the drawings to refer to the same or similar parts.

The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
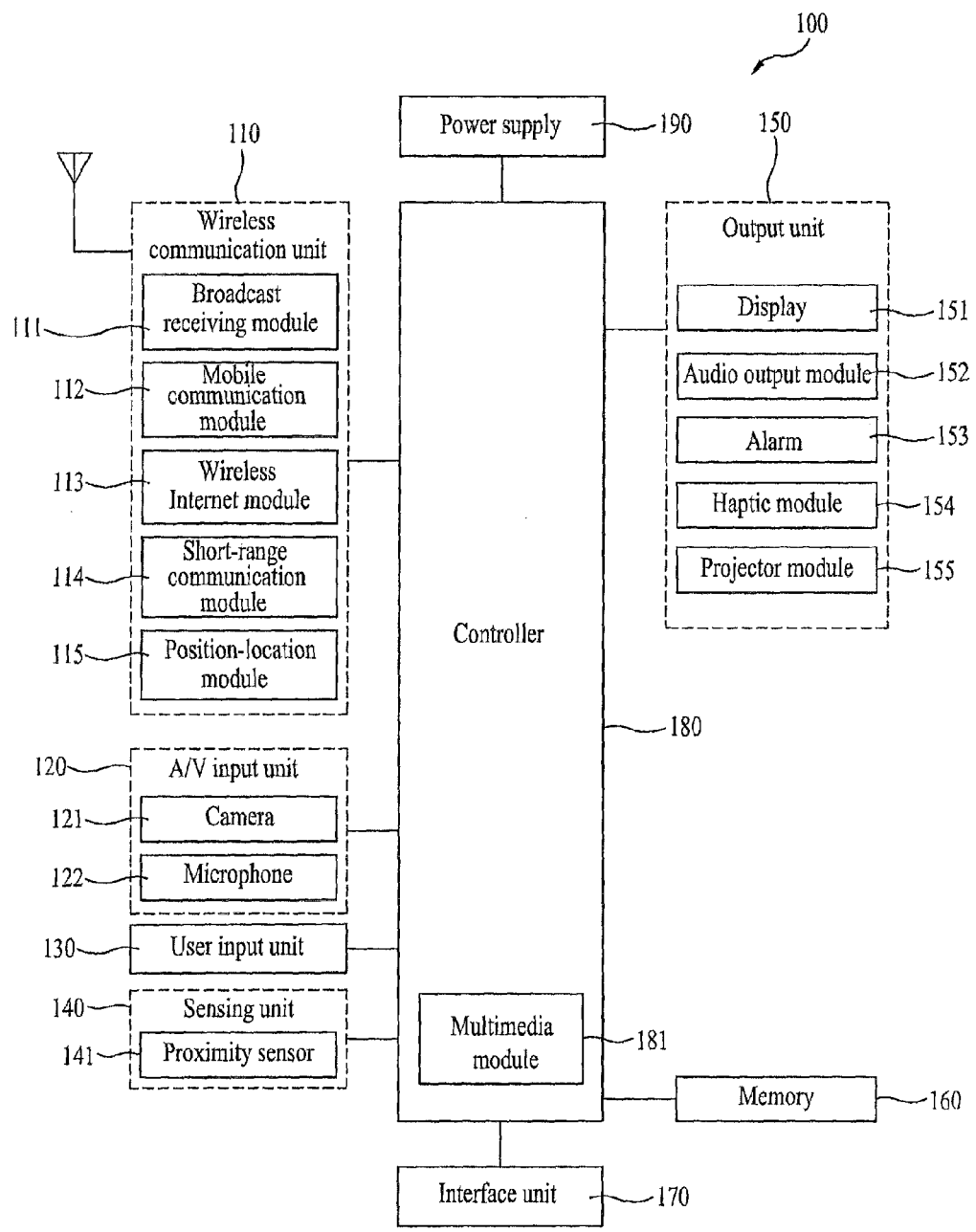
FIG. 1 is a block diagram of a mobile terminal according to one embodiment.

FIG. 1 is a block diagram of a mobile terminal according to one embodiment.

Referring to FIG. 1, a mobile terminal 100 according to one embodiment includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
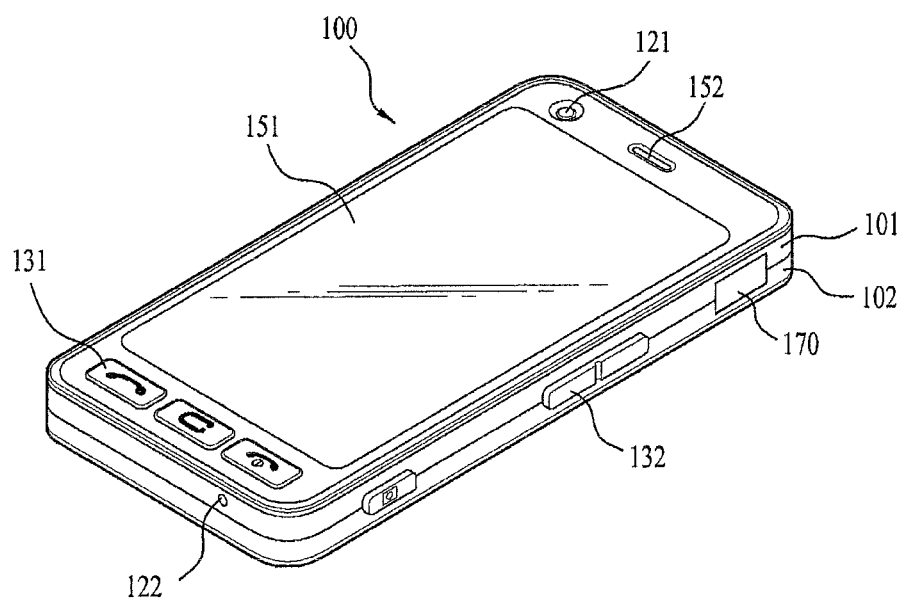
FIG. 2A is a front perspective diagram of a mobile terminal according to one embodiment.

FIG. 2A is a front perspective diagram of a mobile terminal according to one embodiment.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display unit 151 or the like can be inputted to the second manipulating unit 132.

Figure 2B:
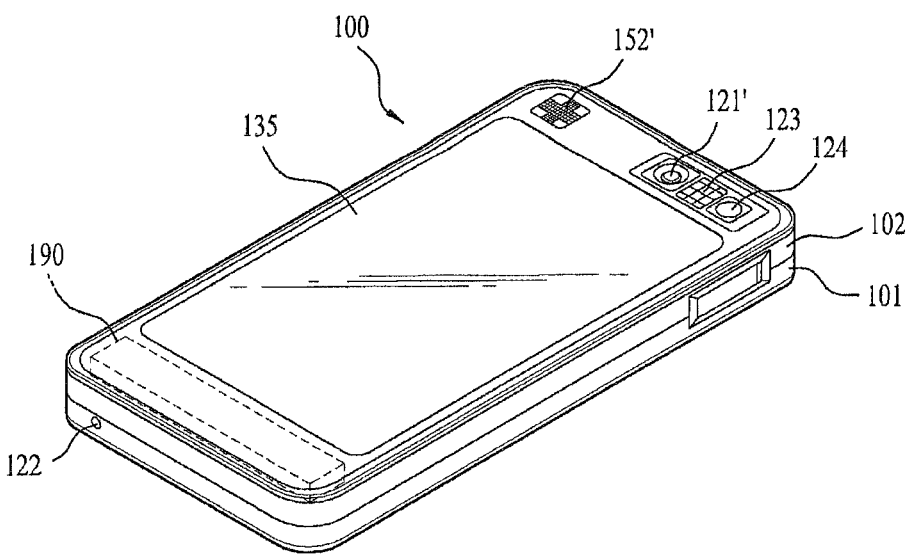
FIG. 2B is a rear perspective diagram of a mobile terminal according to one embodiment.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this case, if the display unit 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

Interconnected operational mechanism between the display unit 151 and the touchpad 135 is explained with reference to FIG. 3 as follows.

Figure 3:
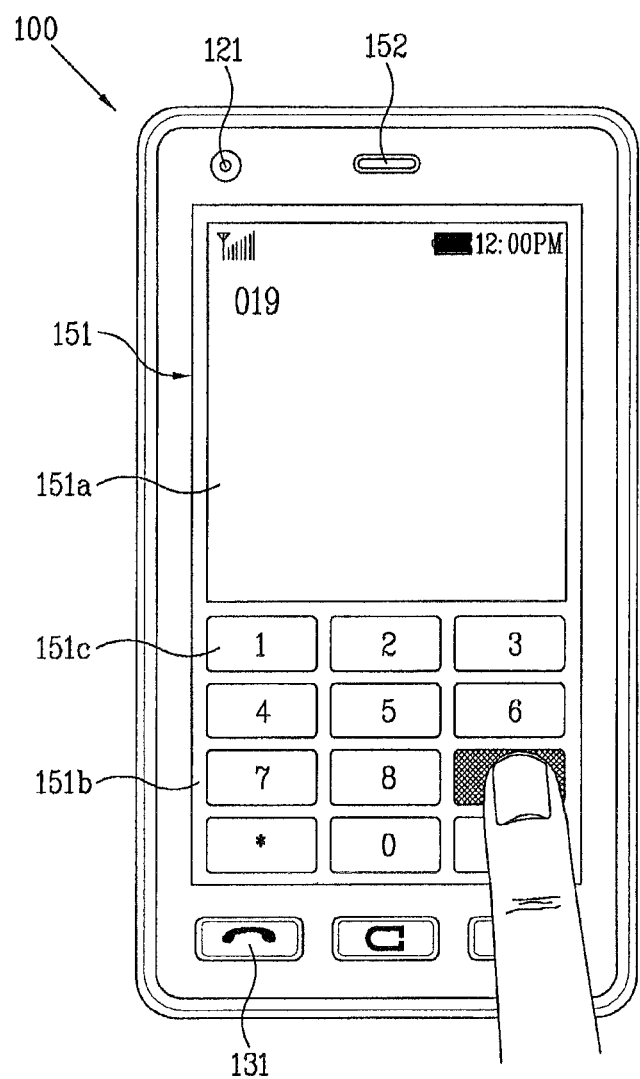
FIG. 3 is front diagram of a mobile terminal according to one embodiment to illustrate one operational status of the mobile terminal.

FIG. 3 is front-view diagram of a terminal according to one embodiment to illustrate an operational state thereof.

First of all, various kinds of visual informations can be displayed on the display unit 151. And, theses informations can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3 shows that a touch applied to a soft key is inputted through a front face of a terminal body.

The display unit 151 is operable through an entire area or by being divided into a plurality of regions. In the latter case, a plurality of the regions can be configured interoperable.

For instance, an output window 151a and an input window 151b are displayed on the display unit 151. A soft key 151c' representing a digit for inputting a phone number or the like is outputted to the input window 151b. If the soft key 151c' is touched, a digit corresponding to the touched soft key is outputted to the output window 151a. If the first manipulating unit 131 is manipulated, a call connection for the phone number displayed on the output window 151a is attempted.

The proximity sensor 141 described with reference to FIG. 1 is explained in detail with reference to FIG. 4 as follows.

Figure 4:
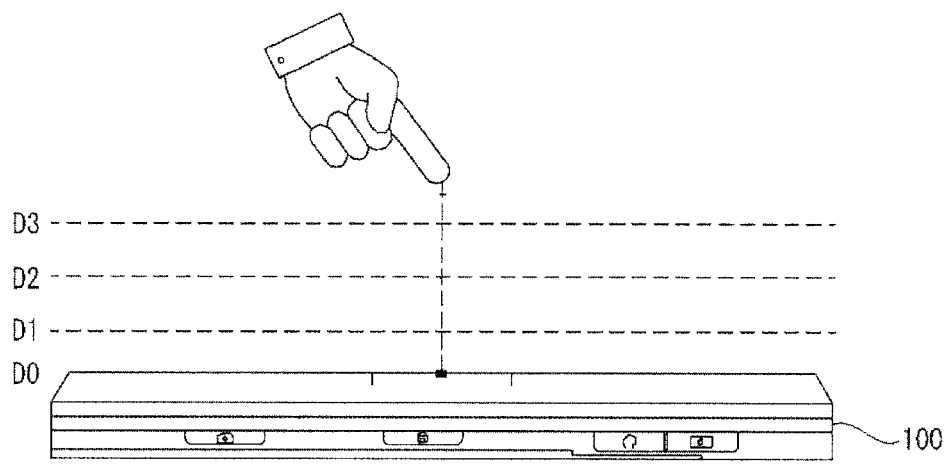
FIG. 4 is a diagram to explain the concept of proximity depth of a proximity sensor.

FIG. 4 is a conceptional diagram for explaining a proximity depth of a proximity sensor.

Referring to FIG. 4, when such a pointer as a user's finger, a pen and the like approaches the touchscreen, a proximity sensor 141 provided within or in the vicinity of the touchscreen detects the approach of the pointer and then outputs a proximity signal.

The proximity sensor 141 can be configured to output a different proximity signal according to a distance between the pointer and the proximity-touched touchscreen (hereinafter named 'proximity depth).

In FIG. 4, exemplarily shown is a cross-section of the touchscreen provided with a proximity sensor capable to three proximity depths for example. And, it is understood that a proximity sensor capable of proximity depths amounting to the number smaller than 3 or equal to or greater than 4 is possible.

In detail, in case that the pointer is fully contacted with the touchscreen (d0), it is recognized as a contact touch. In case that the pointer is located to be spaced apart from the touchscreen in a distance smaller than d1, it is recognized as a proximity touch to a first proximity depth. In case that the pointer is located to be spaced apart from the touchscreen in a distance between d1 and d2, it is recognized as a proximity touch to a second proximity depth. In case that the pointer is located to be spaced apart from the touchscreen in a distance smaller than d3 or equal to or greater than d2, it is recognized as a proximity touch to a third proximity depth. In case that the pointer is located to be spaced apart from the touchscreen in a distance equal to or greater than d3, it is recognized as a proximity touch is released.

Hence, the controller 180 is able to recognize the proximity touch as one of various input signals according to the proximity depth and position of the pointer. And, the controller 180 is able to perform various operation controls according to the various input signals.

Figure 5:
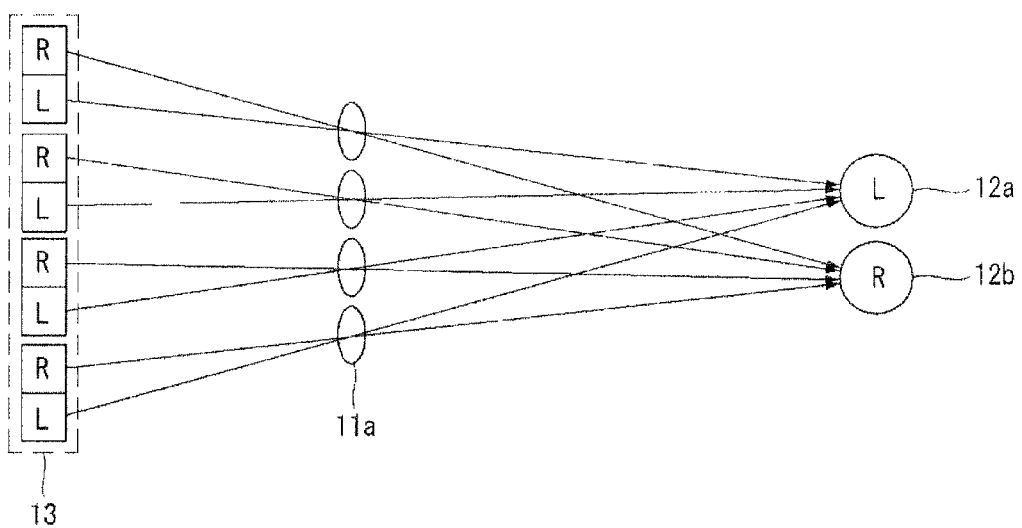
FIG. 5 and FIG. 6 are diagrams for describing a stereoscopic image displaying method using binocular parallax according to embodiments.
Figure 6:
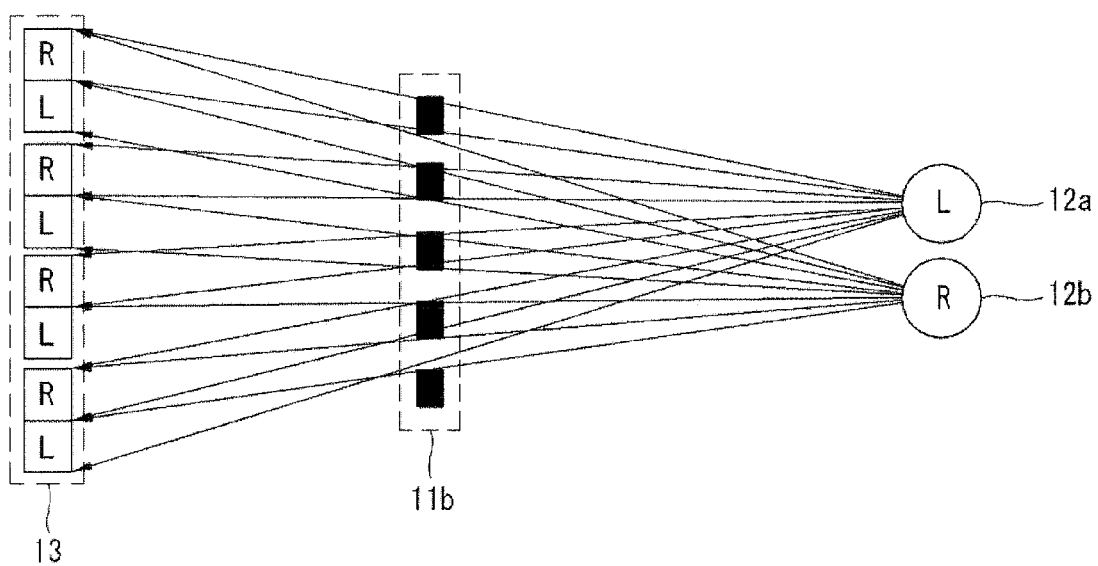

FIG. 5 and FIG. 6 are diagrams for describing a stereoscopic image displaying method using binocular parallax according to embodiments. In particular, FIG. 5 shows a scheme using a lenticular lens array and FIG. 6 shows a scheme using a parallax barrier.

First of all, the binocular parallax means a difference between a right eye vision of an object and a right eye vision of the object. If an image viewed via a left eye and an image viewed via a right eye are synthesized by a human brain, the synthesized image enables the man to sense spectroscopy. A phenomenon enabling a man to sense stereoscopy according to the binocular parallax is called 'stereoscopic vision'. An image causing the stereoscopic vision is called 'stereoscopic image'. If a specific object included in an image causes the stereoscopic vision, a corresponding object is called 'stereoscopic object'.

A stereoscopic image displaying method due to the binocular parallax is classified into a glasses type and a non-glasses type. In this case, the glasses type needs a pair of special glasses, while the non-glasses type does not need a pair of glasses. The glasses type can be further classified into a scheme of using a pair of tinted glasses having waveform selectivity, a polarized glasses type using a shading effect due to a polarizing difference, a time division glasses scheme of proposing left and right images alternately within afterimage duration of eyes, and the like. Besides, there is a scheme of obtaining stereoscopy for a motion in left/right direction due to a time difference of a visionary system attributed to a transmittance difference by providing left and right eyes with filters differing from each other in transmittance, respectively.

According to the non-glasses type, stereoscopy is generated not from an observer but from an image display side. The non-glasses type can be classified into a parallax barrier scheme, a lenticular lens scheme, a microlens array scheme and the like.

Referring to FIG. 5, the display unit 151 includes a lenticular lens array 11a to display a stereoscopic image. In this case, the lenticular lens array 11a is located between a display plane 13 and left/right eye 12a/12b. In particular, a pixel L to be inputted to the left eye 12a and a pixel R to be inputted to the right eye 12b are alternately arranged in a width direction on the display plane. And, the lenticular lens array 11a provides optical discrimination orientation for the pixel L to be inputted to the left eye 12a and the pixel R to be inputted to the right eye 12b. Therefore, an image having passed through the lenticular lens array 11a is observed in a manner of being separated into images for the left and right eyes 12a and 12b, respectively. Subsequently, a human brain synthesizes the images viewed through the left and right eyes 12a and 12b to observe a stereoscopic image.

Referring to FIG. 6, the display unit 151 includes a parallax barrier 11b of a vertical lattice type to display a stereoscopic image. The parallax barrier 11b is located between a display plane 13 and left/right eye 12a/12b. In this case, a pixel L to be inputted to the left eye 12a and a pixel R to be inputted to the right eye 12b are alternately arranged on the display plane 13. The parallax barrier 11b enables an image to be observed in a manner of being separated by the left eye 12a and the right eye 12b via aperture. Therefore, a human brain synthesizes an image viewed via the left eye 12a and an image viewed via the right eye 12b together to observe a stereoscopic image. This parallax barrier 11b is turned on to separate an incident vision only if attempting to display a stereoscopic image. In case of attempting to display a 2D image, the parallax barrier 11b is turned off to let an incident vision to pass through without being separated.

Meanwhile, the above described stereoscopic image displaying methods are provided to explain embodiments of the present disclosure, by which the present disclosure is non-limited. Moreover, the device as disclosed herein may be able to display a stereoscopic image using binocular parallax by various schemes as well as the above described methods.

First of all, a mobile terminal mentioned in this disclosure can include at least one of the components shown in FIG. 1. And, the display unit 151 shown in FIG. 1 can perform a 3D display as well as a 2D display. Moreover, the display unit 151 can further include a touchscreen.

In this case, according to the 3D display, different images are respectively provided to both eyes (i.e., left eye and right eye) of a user to enable to view a corresponding image 3-dimensionally (or stereoscopically) for example. Moreover, the display unit 151 3-dimensionally displays an image currently displayed on a screen or is able to 3-dimensionally display a specific one of a plurality of objects included in an image displayed on the screen.

In the following description, a method of controlling an image display is explained with reference to the accompanying drawings.

First of all, an image display controlling method of a mobile terminal according to a first embodiment is explained with reference to FIGS. 7 to 15D as follows.

Figure 7:
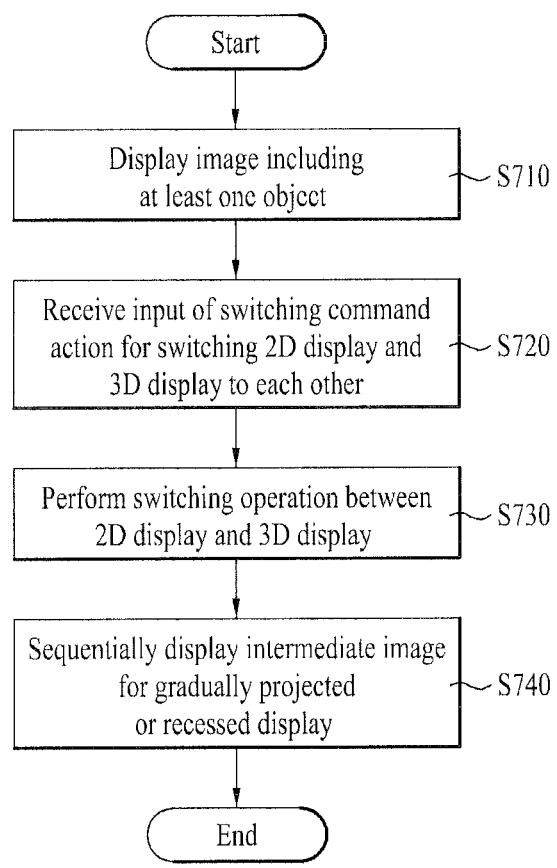
FIG. 7 is a flowchart of an image display controlling method of a mobile terminal according to a first embodiment.

FIG. 7 is a flowchart of an image display controlling method of a mobile terminal according to a first embodiment.

Referring to FIG. 7, the mobile terminal 100 displays an image including at least one object via the display unit 151 [S710].

For instance, the object includes an icon image indicating a menu item. And, the object can include a photo (or a video) displayed as a thumbnail. Moreover, the object is able to include at least one thing (e.g., a man, a building, etc.) included in the image.

In the displaying step S710, the mobile terminal 100 is able to display the image 2-dimensionally or 3-dimensionally.

In this case, the 2D display means that an extent to which an object included in the image is projected or recessed (projected/recessed extent or perceived 3-dimensional depth) is set to 0. In other words, the perceived 3-dimensional depth of the displayed object is not configured to either protrude or recede into the display. And, the 3D display can mean that the object included in the image is displayed by being projected [hereinafter referred to as a 3D projected display] or by being recessed [hereinafter referred to as a 3D recessed display]. Therefore, in case that a specific object included in an image is displayed according to the 3D projected display, the specific object can be displayed in a manner of being projected at a distance that is higher than the rest of objects. In case that a specific object included in an image is displayed according to the 3D recessed display, the specific object can be displayed in a manner of being recessed at a distance that is lower than the rest of objects.

In the following description, a case of performing a 3D projected or recessed display according to a position of a left/right eye image is explained in detail with reference to FIG. 8A and FIG. 8B.

Figure 8A:
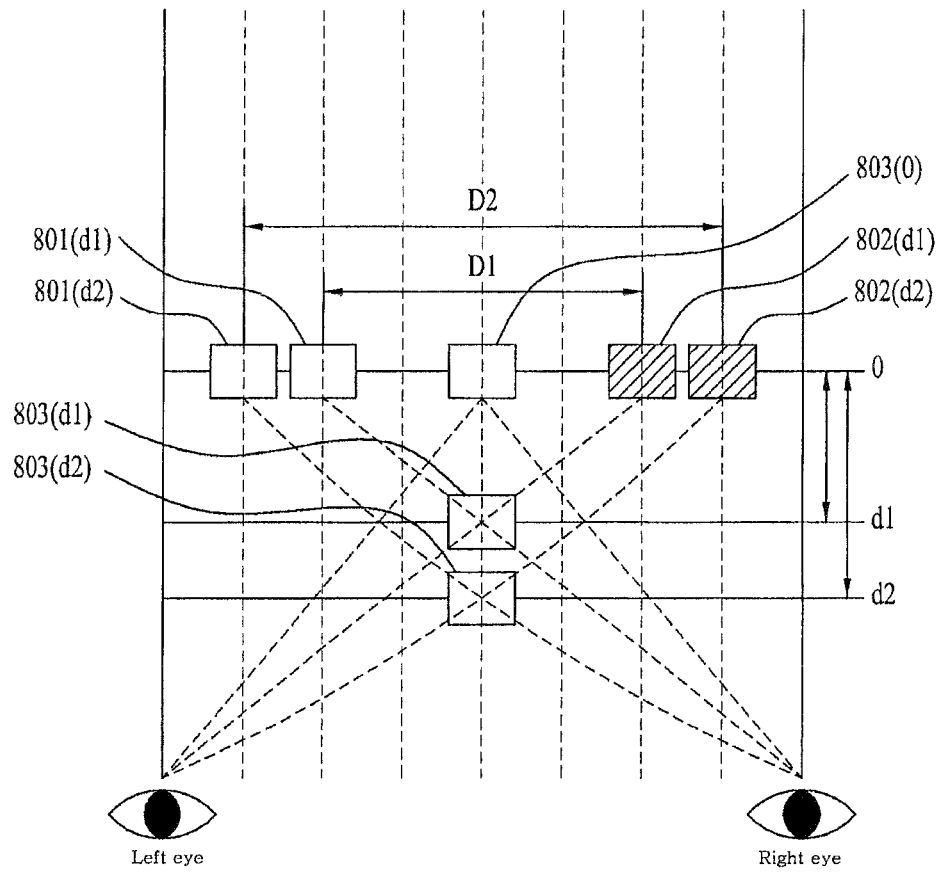
FIG. 8A is a diagram for a projected display due to left/right eye image position.
Figure 8B:
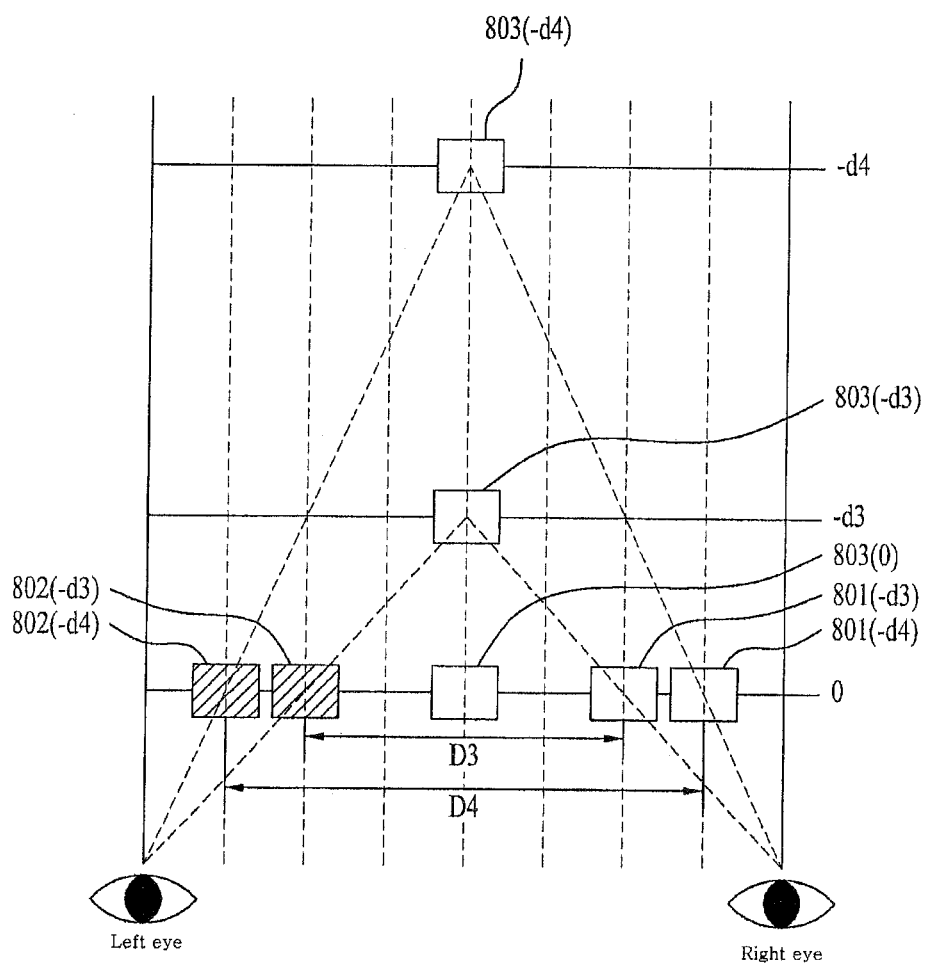
FIG. 8B is a diagram for a recessed display due to left/right eye image position.

Referring to FIG. 8A and FIG. 8B, the mobile terminal 100 sets a left eye image and a right eye image different from each other to perform a 3D display. The mobile terminal 100 is then able to 3-dimensionally display an image generated from synthesizing the left and right eye images together via the display unit 151.

In this case, a projected or recessed extent of the synthesized image can depend on a distance between the left and right eye images and positions of the left and right eye images. According to a position of a crossing point between a straight line from the left eye to the left eye image (hereinafter named a left eye straight line) and a straight line from the right eye to the right eye image (hereinafter named a right eye straight line), if the crossing point (intersection) is located in front of a point having a projected (or recessed) extent set to 0, the synthesized image is displayed in a manner of being projected. If the crossing point is located in rear of the corresponding point, the synthesized image can be displayed in a manner of being recessed.

FIG. 8A is a diagram for a projected display of a synthesized image.

Referring to FIG. 8A, in case of being located at a same position to have a distance between a left eye image and a right eye image set to 0, the mobile terminal 100 is able to actually bring a same effect of a 2D display in a manner of setting a projected extent of a synthesized image 803(0) to 0.

When a distance between a right eye image 801(d1) and a left eye image 802(d1) is set to D1, if a crossing point between a right eye straight line and a left eye straight line is located at d1 from a point having a projected extent set to 0, the mobile terminal 100 is able to display a synthesized image 803(d1) projected by d1.

When a distance between a right eye image 801(d2) and a left eye image 802(d2) is set to D2 (>D1), if a crossing point between a right eye straight line and a left eye straight line is located at d2 (>d1) from a point having a projected extent set to 0, the mobile terminal 100 is able to display a synthesized image 803(d2) projected by d2.

Namely, assuming that a crossing point between a right eye straight line and a left eye straight line is located in front of a point having a projected extent set to 0, if a distance between a right eye image and a left eye image increases more, a synthesized image can be displayed in a manner of being further projected.

FIG. 8B is a diagram for a recessed display of a synthesized image.

Referring to FIG. 8B, in case of being located at a same position to have a distance between a left eye image and a right eye image set to 0, the mobile terminal 100 is able to actually bring a same effect of a 2D display in a manner of setting a recessed extent of a synthesized image 803(0) to 0.

When a distance between a right eye image 801(−d3) and a left eye image 802(−d3) is set to D3, if a crossing point between a right eye straight line and a left eye straight line is located at −d3 from a point having a recessed extent set to 0, the mobile terminal 100 is able to display a synthesized image 803(−d3) recessed by −d3.

When a distance between a right eye image 801(−d4) and a left eye image 802(−d4) is set to D4 (>D3), if a crossing point between a right eye straight line and a left eye straight line is located at −d4 (<−d3) from a point having a recessed extent set to 0, the mobile terminal 100 is able to display a synthesized image 803(−d4) recessed by −d4.

Namely, assuming that a crossing point between a right eye straight line and a left eye straight line is located in rear of a point having a recessed extent set to 0, if a distance between a right eye image and a left eye image increases more, a synthesized image can be displayed in a manner of being further recessed.

Referring again to FIG. 7, in the course of performing the displaying step S710, the mobile terminal 100 receives an input of a switching command action for switching to either a 2D display or a 3D display via the user input unit 130 [S720]. In other words, the display mode of the mobile terminal 100 may be switched between a 2D and a 3D mode.

In particular, in case that a current display scheme is a 2D display, the mobile terminal 100 is able to receive an input of a switching command action for switching the 2D display to a 3D recessed or projected display. On the contrary, in case that a current display scheme is a 3D display (e.g., a 3D projected display, a 3D recessed display, etc.), the mobile terminal 100 is able to receive an input of a switching command action for switching the 3D display to a 2D display.

Moreover, in case that a current display scheme is a 3D recessed display (or a 3D projected display), the mobile terminal 100 is able to perform a switching command operation for switching the 3D recessed display (or the 3D projected display) to the 3D projected display (or the 3D recessed display).

If a user selects a menu item or a key (or a key region_touchscreen is included), which corresponds to a display scheme switching command, the mobile terminal 100 is able to receive an input of a switching command action.

In case that the display unit 151 includes a touchscreen, the mobile terminal 100 is able to receive an input of a touch operation (or a touch action) corresponding to a switching command as a switching command action.

For instance, in case that a 2D display is being performed, a touch action corresponding to a switching command for switching a 2D display to a 3D recessed or projected display can have a different touch pattern. In particular, a touch action corresponding to a switching command for switching to a 3D recessed display includes a touch & drag action from one point corresponding to an object to display 3-dimensionally to a right direction. And, a touch action corresponding to a switching command for switching to a 3D projected display can include a touch & drag action from one point corresponding to an object to display 3-dimensionally to a left direction.

Meanwhile, the mobile terminal 100 is able to receive an input of an inclining action (e.g., rotation of the mobile terminal 100) by a predetermined angle in a predetermined direction as a switching command action. In this case, the mobile terminal 100 is able to detect a direction and angle of the inclining action as well as a presence or non-presence of generation of the inclining action, using a motion detect sensor included in the user input unit 130 or the sensing unit 140.

In particular, in case of detecting an inclining action over a predetermined angle in a clockwise or counterclockwise direction, the mobile terminal 100 is able to receive an input of a switching command action.

For instance, in case of detecting an inclining action over 10 degrees clockwise in a 2D display mode, the mobile terminal 100 is able to receive a switching command action for switching to a 3D display. In case of returning to a mode prior to the detection of the inclining action (e.g., the mobile terminal is rotated back to the original position), the mobile terminal 100 is able to maintain the 3D display switched by the inputted switching command action.

In the course of performing a 2D display, in case of detecting an inclining action over a predetermined angle clockwise, after the mobile terminal 100 has received an input of a switching command action for switching to a 3D projected display, if the mobile terminal 100 detects an inclining action over a predetermined angle counterclockwise, the mobile terminal 100 is able to receive an input of a switching command action for switching to a 3D projected display. Moreover, in case of returning to a mode prior to the detection of the inclining action (e.g., the mobile terminal is rotated back to the original position), the mobile terminal 100 is able to maintain the 3D projected or recessed display switched by the inputted switching command action.

In the course of performing a 2D display (or a 3D display) in a vertical view direction (or a horizontal view direction), if the mobile terminal 100 detects an inclining action within a predetermined angle clockwise or counterclockwise or the vertical view direction (or the horizontal view direction) is changed into the horizontal view direction (or the vertical view direction), the mobile terminal 100 is able to receive an input of a switching command action for switching to a 3D display (or a 2D display).

Moreover, the mobile terminal 100 is able to receive an input of a shaking action for shaking the mobile terminal 100 as a switching command action.

For instance, if a predetermined count of shaking actions are inputted, the mobile terminal 100 is able to receive an input of a switching command action. In the course of performing a 2D display, if a single shaking action is inputted, the mobile terminal 100 is able to receive an input of a switching command action for switching to a 3D recessed display. If two shaking actions are inputted, the mobile terminal 100 is able to receive an input of a switching command action for switching to a 3D projected display.

Under the control of the controller 180, in case of receiving the switching command action in the inputting step S720, the mobile terminal 100 performs a switching operation between a 2D display and a 3D display [S730].

For instance, if a 2D display is currently being performed, the mobile terminal 100 performs a switching operation from the 2D display to a 3D display. For another instance, if a 3D display is currently being performed, the mobile terminal 100 performs a switching operation from the 3D display to a 2D display.

Moreover, if a 2D display is currently being performed, the mobile terminal 100 is able to perform a switching operation from the 2D display to a 3D recessed or projected display according to whether a 3D display scheme indicated by the inputted switching command action is a recessed display or a projected display.

Under the control of the controller 180, in order to display a prescribed one of at least one or more objects included in the displayed image in the course of performing the switching operation in a manner that the prescribed object becomes projected or recessed gradually, the mobile terminal 100 sequentially displays at least one intermediate image [S740]. In this case, the displaying step S740 can be performed via the display unit 151.

The at least one intermediate image includes at least one object included in the image displayed in the displaying step S710 and can have a sequentially projected or recessed extent for the target object of the switching operation.

The mobile terminal 100 performs a switching operation on a specific object selected by a user from the displayed at least one or more objects or is able to perform a switching operation on all of the displayed at least one or more objects. Specifically, in the former case, the user input unit 130 is able to receive an input of a selection action for a specific object from a user prior to execution of the switching operation. Moreover, the mobile terminal 100 is able to perform a switching operation on the displayed image itself rather than a selected object.

According to a first case, under the control of the controller 180, in case of performing a switching operation from a 2D display to a 3D display, the mobile terminal 100 is able to sequentially display at least one or more intermediate images in order of increasing a projected extent of a switching target object.

According to a second case, under the control of the controller 180, in case of performing a switching operation from a 2D display to a 3D recessed display, the mobile terminal 100 is able to sequentially display at least one or more intermediate images in order of increasing a recessed extent of a switching target object.

Furthermore, according to the first or second case, a projected/recessed extent of the switching target object in the intermediate images can be set smaller than a projected/recessed extent of the switching target object after completion of the switching operation, by the controller 180.

Moreover, a graphical effect may be provided such that the change in the displayed image from 2D to 3D may appear to be elastically or flexibly changed. For example, the extent to which the switching target object appears to protrude or recede may be gradually increased in each of the intermediate images such that the switching target object appears to protrude or recede by an amount greater than in the final 3D image prior to returning to an amount set for the final 3D image. The intermediate image having the projected or recessed amount greater than the final 3D image may be an intermediate image immediately prior to displaying the final 3D image. Accordingly, the change in the display of the switching target object image may appear to elastically or flexibly change.

According to a third case, under the control of the controller 180, in case of performing a switching operation from a 3D projected display to a 2D display, the mobile terminal 100 is able to sequentially display at least one or more intermediate images in order of decreasing a projected extent of a switching target object.

According to a fourth case, under the control of the controller 180, in case of performing a switching operation from a 3D recessed display to a 2D display, the mobile terminal 100 is able to sequentially display at least one or more intermediate images in order of decreasing a recessed extent of a switching target object.

Furthermore, according to the third or fourth case, a projected/recessed extent of the switching target object in the intermediate images can be set to be greater than a projected/recessed extent of the switching target object in the final 2D image after completion of a switching operation, by the controller 180.

Moreover, a graphical effect may be provided such that the change in the displayed image from 3D to 2D may appear to be elastically or flexibly changed. For example, in case of a projected 3D image, the extent to which the switching target object appears to protrude in each of the intermediate images may be gradually decreased. Moreover, prior to displaying the final 2D image, an intermediate image displayed immediately prior to the final 2D image may display the switching target object to appear recessed into the display such that the switching target object appears to elastically or flexibly change from a 3D image to a 2D image. A similar process may be used for changing a recessed 3D image to a 2D image.

As mentioned in the foregoing description, the mobile terminal displays an image using a process for projecting/recessing a switching target object gradually in a manner of displaying at least one or more intermediate images differing from each other in a projected/recessed extent of the switching target object as well as displays a switching target object having a specific projected/recessed extent in case of completion of a switching operation.

This displaying step S740 is explained in detail with reference to the accompanying drawings as follows.

FIGS. 9A to 11C are diagrams for an intermediate image display according to an input of a switching command action. For clarity and convenience, a vertical view as shown in FIGS. 9A to 9D or FIGS. 10A to 10C is assumed as having an incline angle ranging from zero to 10 degrees, while a horizontal view is assumed as having an incline angle ranging from 80 to 90 degrees (reference_vertical view).

Figure 9A:
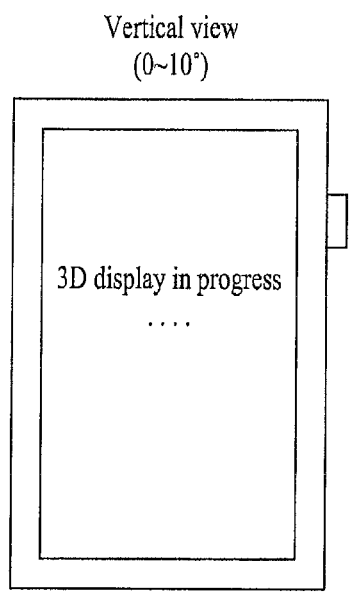
FIGS. 9A to 11E are diagrams of a process for receiving an input of a switching command action.
Figure 9B:
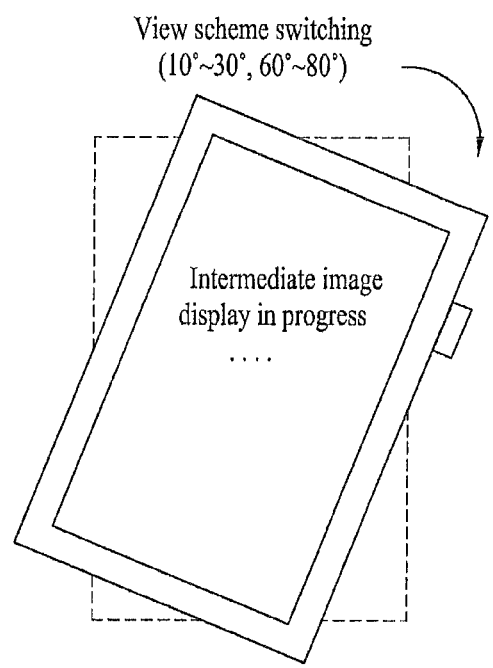

FIGS. 9A to 9D illustrates changing a 3D vertical view to a 3D horizontal view according to one embodiment. While a 3D display is being performed in a vertical view as shown in FIG. 9A, if the mobile terminal 100 is inclined (or rotated) clockwise, it is able to sequentially display at least one or more intermediate images within an incline angle range between 10 and 30 degrees as shown in FIG. 9B.

For instance, a display timing point of an intermediate image can be determined according to the incline angle. In particular, a first intermediate image can be displayed at 15 degrees. A second intermediate image can be displayed at 20 degrees. And, a third intermediate image can be displayed at 25 degrees. In other words, the perceived 3-dimensional depth of the image may be changed at prescribed intervals corresponding to the position of the mobile terminal 100.

Figure 9C:
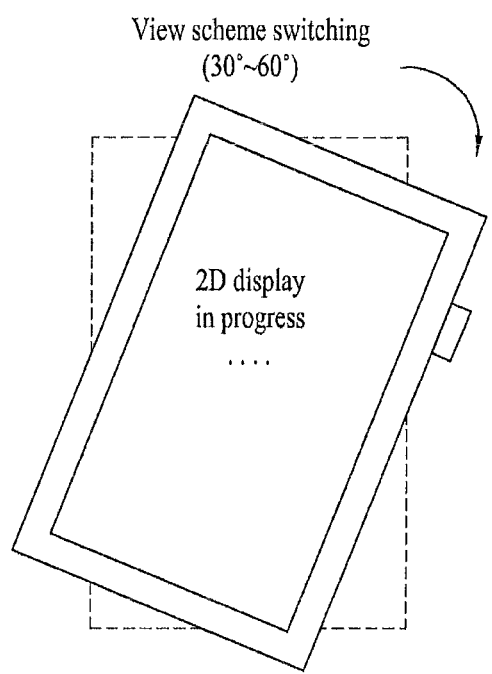

In case that the mobile terminal 100 further inclines to have an incline angle between 30 and 60 degrees, it is able to complete a switching operation from a 3D display to a 2D display as shown in FIG. 9C.

In case that the mobile terminal 100 further inclines to have an incline angle between 60 and 80 degrees, it is able to sequentially display at least one or more intermediate images as shown in FIG. 9B.

Figure 9D:
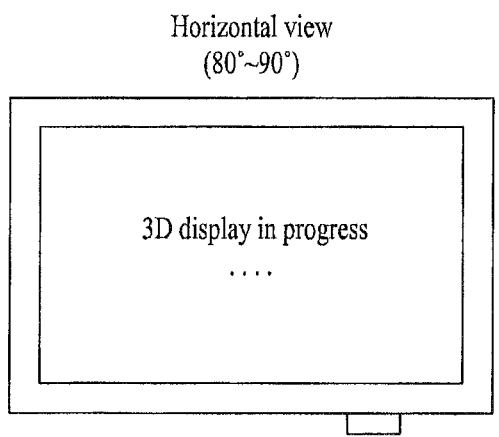

In case that a horizontal view is set to have an incline angle over 80 degrees, the mobile terminal 100 completes a switching operation from a 2D display to a 3D display and is then able to perform the 3D display in the horizontal view as shown in FIG. 9D.

Moreover, when the mobile terminal 100 has completed the switch to a 2D display (e.g., at an incline angle between 30 to 60 degrees as shown in FIG. 9C), if the mobile terminal 100 is rotated back to its original position (e.g., to an angle between 0 to 10 degrees as shown in FIG. 9A), the 2D display may be maintained on the mobile terminal 100. It should be appreciated that the initial display mode of FIG. 9A may be a 2D display mode, and the display mode of FIG. 9C may be a 3D display mode. Here, the intermediate images of FIG. 9B may be 3D images having a progressively increasing extent in which the object protrudes or recedes into the display.

Figure 10A:
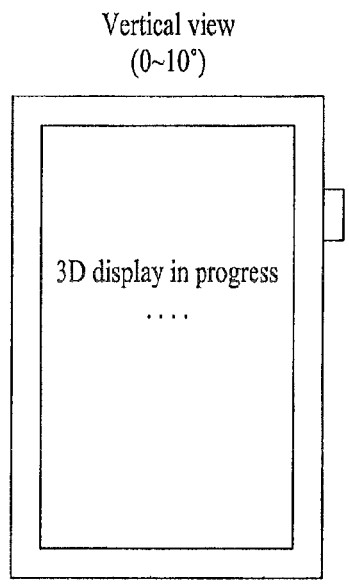
Figure 10B:
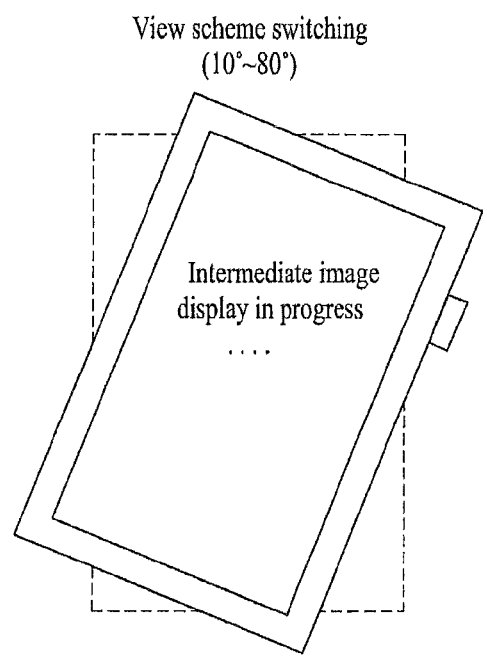
Figure 10C:
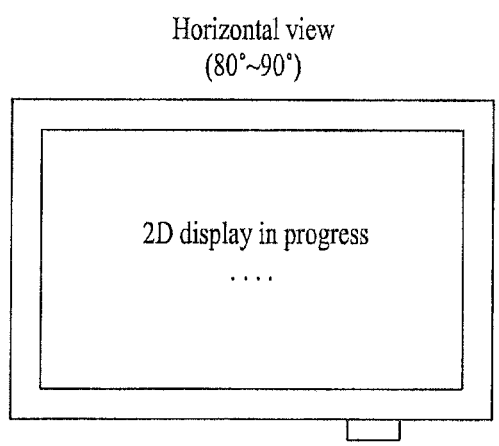

FIG. 10A to 10C illustrates changing a 3D vertical view to a 2D horizontal view according to one embodiment. While a 3D display is being performed in vertical view as shown in FIG. 10A, if the mobile terminal 100 inclines clockwise (before switching to a horizontal view), it is able to sequentially display at least one or more intermediate images as shown in FIG. 10B.

For instance, a display timing point of an intermediate image can be determined according to an incline angle. In particular, a first intermediate image can be displayed at 15 degrees. A second intermediate image can be displayed at 30 degrees. A third intermediate image can be displayed at 45 degrees. A fourth intermediate image can be displayed at 60 degrees. And, a fifth intermediate image can be displayed at 75 degrees.

Moreover, in case that a horizontal view is set to have an incline angle over 80 degrees, the mobile terminal 100 completes a switching operation from a 3D display to a 2D display and is then able to perform the 2D display in the horizontal view as shown in FIG. 10C.

If the mobile terminal 100 is rotated back to the vertical view prior to reaching the horizontal view (e.g., 80 to 90 degrees), the changes in the display may be reversed and the original 3D image may be displayed on the mobile terminal 100 as shown in FIG. 10A. For example, the intermediate images may be displayed in reverse order, according to the display timing point, to return the display to its original state. It should be appreciated that the initial display mode of FIG. 10A may be 2D display and the final display mode of FIG. 10C may be a 3D display mode.

Meanwhile, in FIGS. 9A to 9D or FIGS. 10A to 10C, the mobile terminal 100 can incline counterclockwise. If the mobile terminal 100 inclines counterclockwise, an angle of the vertical view may range between 0 and 10 degrees and an angle of the horizontal view can range between −80 and −90 degrees.

FIGS. 11A to 11E show a process for performing a 3D projected/recessed display according to an incline direction. For clarity and convenience in the descriptions with reference to FIGS. 11A to 11E, a horizontal view is assumed as having an incline angle between −10 and 10 degrees and a vertical view is assumed a having an incline angle between 80 and 90 degrees or between −80 and −90 degrees (reference_horizontal view).

Figure 11A:
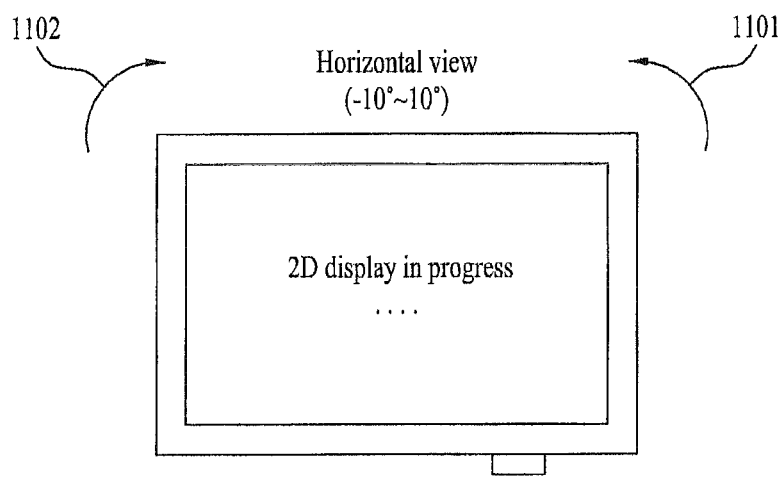

Referring to FIG. 11A, the mobile terminal 100 is able to perform a 2D display in a horizontal view.

Figure 11B:
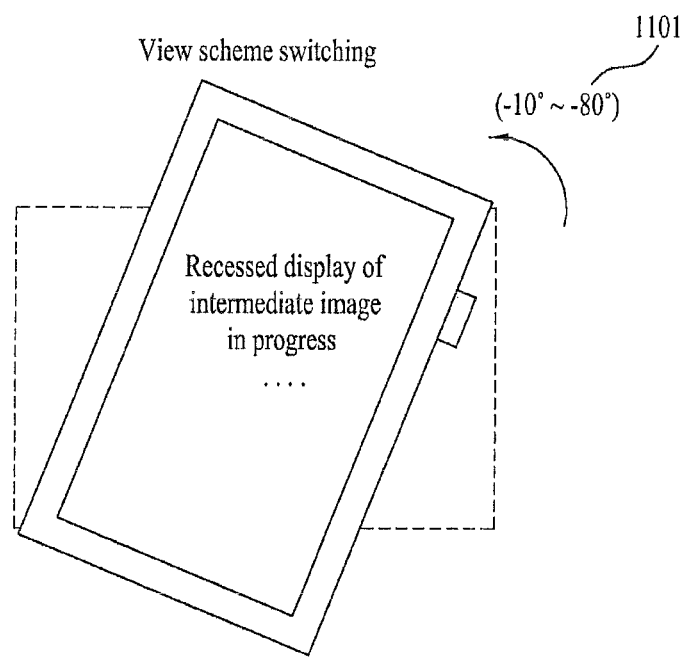
Figure 11C:
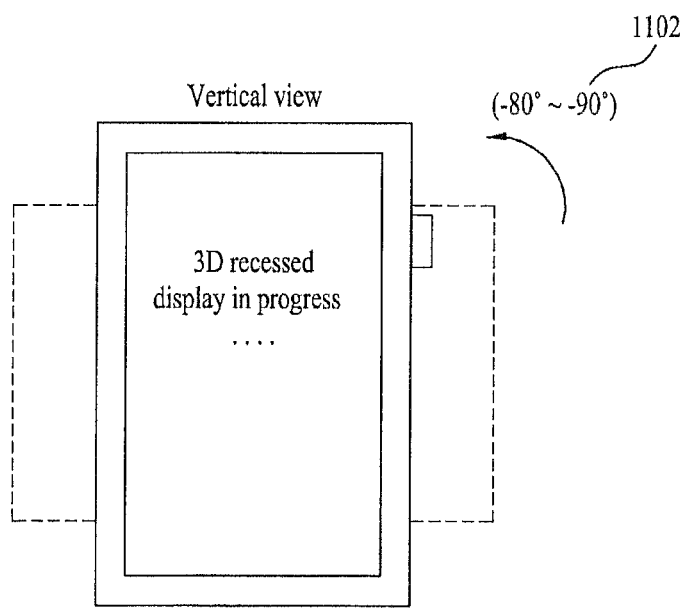

Referring to FIGS. 11B and 11C, if the mobile terminal 100 inclines counterclockwise 1101 in FIG. 11A, the mobile terminal 100 sequentially displays at least one or more intermediate images before switching to a vertical view (e.g., an incline angle between −10 and −80 degrees) [FIG. 11B]. If the switching to the vertical view is completed (e.g., an incline angle between −80 and −90 degrees), the mobile terminal 100 completes the switching operation to a 3D recessed display from the 2D display and is then able to perform the 3D recessed display [FIG. 11C].

In doing so, it is able to display a process for recessing a specific object or image itself gradually using at least one intermediate image.

Figure 11D:
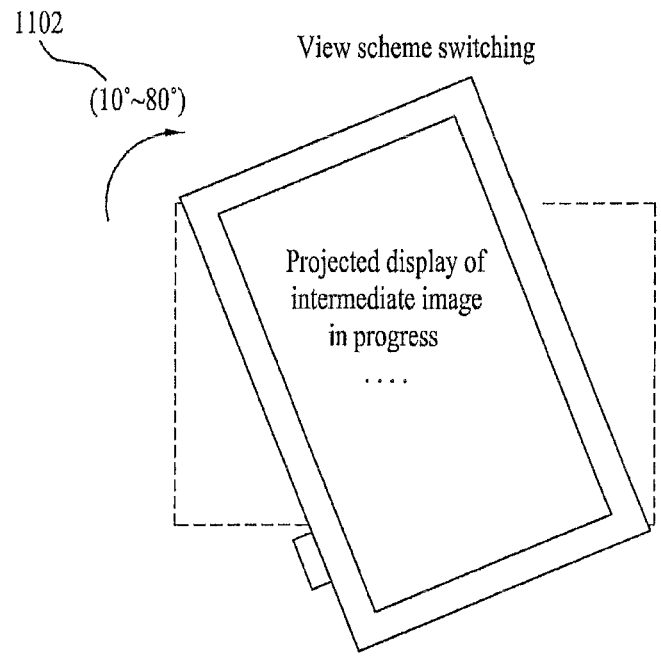
Figure 11E:
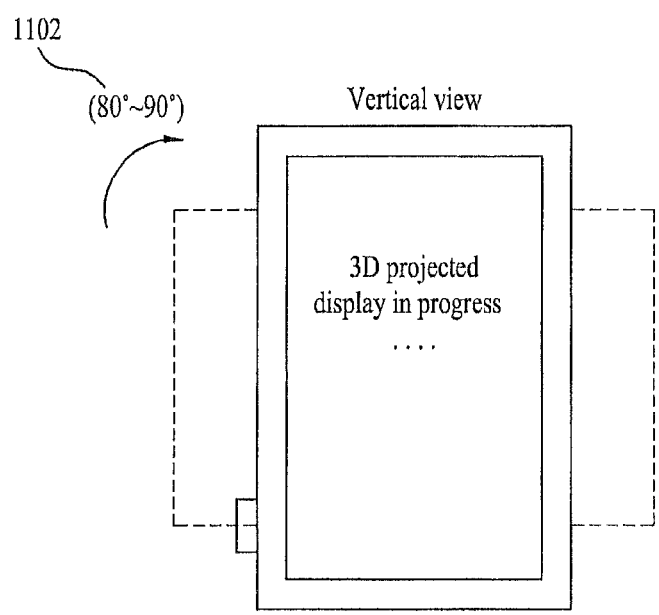

Referring to FIGS. 11D to 11E, if the mobile terminal 100 inclines clockwise 1102 as shown in FIG. 11A, the mobile terminal 100 sequentially displays at least one or more intermediate images before switching to a horizontal view (e.g., an incline angle between 10 and 80 degrees) [FIG. 11D]. If the switching to the vertical view is completed (e.g., an incline angle between 80 and 90 degrees), the mobile terminal 100 completes the switching operation to a 3D projected display from the 2D display and is then able to perform the 3D projected display [FIG. 11E].

In doing so, the mobile terminal 100 is able to display an image based on a process for projecting a specific object or image itself gradually using at least one intermediate image.

Meanwhile, according to the embodiments described with reference to FIGS. 9A to 11E, the 3D display and the 2D display are applicable in a manner of being switched to each other. For example, while the initial display mode as shown in FIG. 11A is described herein as being a 2D image, the present disclosure is not limited thereto, and the initial displayed image may be a 3D image which may be switched to a 2D image. Since the specific angles mentioned in the descriptions of FIGS. 9 to 11 are just exemplary, other numerical values are applicable thereto. While a specific key or button provided to the terminal shown in one of FIGS. 9 to 11 is selected, if an incline action is inputted, a switching operation can be performed. Moreover, after the specific key has been selected, if an incline action is inputted, a switching operation can be performed.

In the following description, explained is a process for displaying a switching target object among a plurality of objects (hereinafter named objects icons 1 to 4) in the course of performing a switching operation between a 3D display and a 2D display in a manner of gradually projecting or recessing the switching target object.

For clarity and convenience of the following description, the switching target object is limited to the object icon 1. Of course, the switching target object can include a displayed image itself or every object included in an image.

FIGS. 12A to 12F are diagrams of a process for projecting and displaying object icons sequentially according to one embodiment. In particular, FIGS. 12A to 12F shows a case that a rate of increase of a projected extent is constant (e.g., a slope/rate of change or a projected speed is constant).

For clarity and convenience of the following description, assume that total two intermediate images are displayable. And, assume that a first intermediate image and a second intermediate image are displayable at points t/3 and 2t/3 of an execution time period t of a switching operation, respectively. Of course, the number of intermediate images and display points are settable in various ways.

Figure 12A:
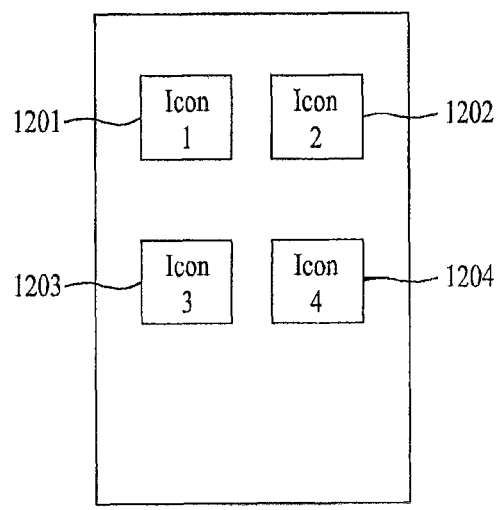
FIG. 12A to 12F are first diagrams of a projected display process for displaying object icons sequentially.

Referring to FIGS. 12A to 12D, the mobile terminal 100 2-dimensionally displays an image including object icons 1 to 4 1201 to 1204 and is then able to perform a switching operation to a 3D projected display on the object icon 1 1201 [FIG. 12A].

In this case, the switching operation can be executed if a user selects a key, key zone or menu item corresponding to a switching operation execution.

Figure 12B:
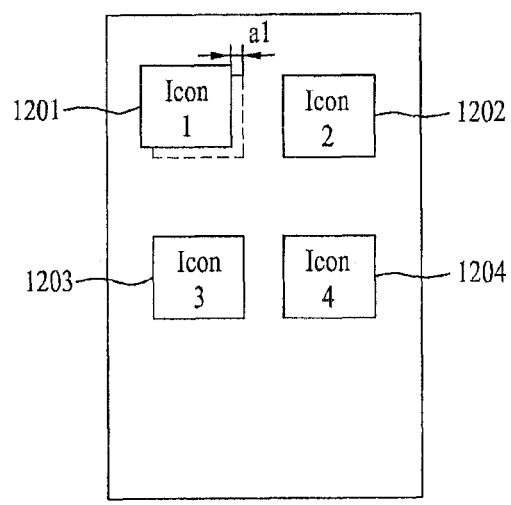

The mobile terminal 100 is able to 3-dimensionally display a first intermediate image, in which the object icon 1 1201 is projected by a1 at a point t/3 after an execution start of the switching operation [FIG. 12B]. And, the mobile terminal 100 is also able to 3-dimensionally display a second intermediate image, in which the object icon 1 1201 is projected by 2a1 at a point 2t/3 after the execution start of the switching operation [FIG. 12C].

Figure 12C:
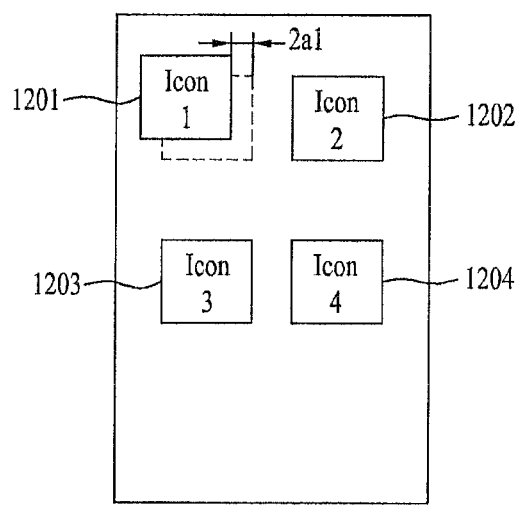
Figure 12D:
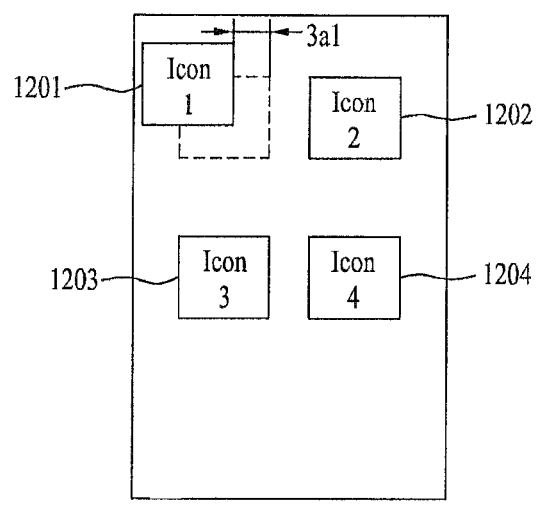

Moreover, the mobile terminal 100 is able to 3-dimensionally display an image, in which the object icon 1 1201 is projected by 3a1 at a point of completion of the switching operation [FIG. 12D].

The process for performing or executing the switching operation shown in FIGS. 12A to 12D is examined with reference to FIGS. 12E to 12F as follows.

Figure 12E:
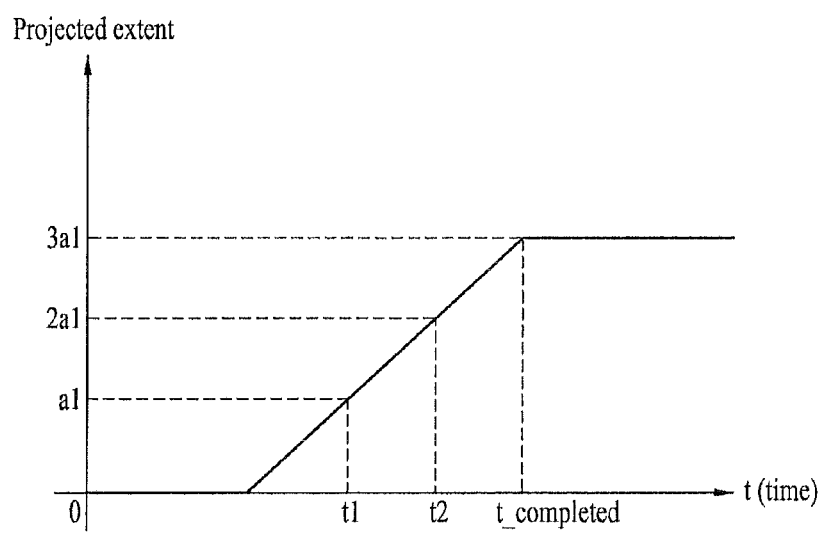
Figure 12F:
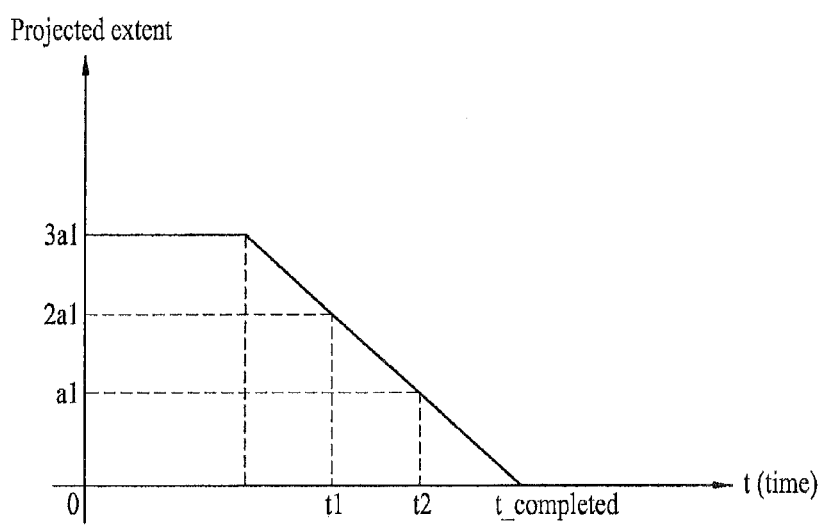

Referring to FIG. 12E, when a switching operation to a 3D projected display is executed in the course of performing a 2D display, the object icon 1 1201 is projected and displayed by a1 at a point t/3 (=t1), the object icon 1 1201 is projected and displayed by 2a1 at a point 2t/3 (=t2), and the object icon 1 1201 is projected and displayed by 3a1 at a completion point t (=t_completed) of the switching operation. In particular, it can be observed that the projected extent of the object icon 1 1201, which is the switching target object for the progress time of the switching operation, has a constant slope (constant rate of change in the projected extent).

A process for switching from a 3D projected display to a 2D display is explained with reference to FIGS. 12A to 12D and FIGS. 12E to 12F as follows. For clarity and convenience of the following description, assume that the object icon 1 in the 3D projected display is displayed in a manner of being projected by 3a1.

First of all, the mobile terminal 100 is able to 3-dimensionally display the first intermediate image in which the object icon 1 1201 is projected by 2a1 (reduced by a1 smaller than that of the 3D projected display) at a point t/3 after an execution start of the switching operation [cf. FIG. 12C]. And, the mobile terminal 100 is able to 3-dimensionally display the second intermediate image in which the object icon 1 1201 is projected by a1 (i.e., reduced by 2a1 smaller than that of the 3D projected display) at a point 2t/3 after an execution start of the switching operation [cf. FIG. 12B].

Moreover, the mobile terminal 100 is able to 2-dimensionally display an image including the object icon 1 1201 (projected extent=0) at a point of completion of the switching operation [cf. FIG. 12A].

Referring to FIG. 12E, when a switching operation to a 2D display is executed in the course of performing a 3D projected display, the object icon 1 1201 is projected and displayed by 2a1 at a point t/3 (=t1), the object icon 1 1201 is projected and displayed by a1 at a point 2t/3 (=t2), and the object icon 1 1201 is 2-dimensionally displayed at a completion point t (=t_completed) of the switching operation in a manner of not being projected.

FIGS. 13A to 13D and FIGS. 13E to 13F are diagrams of a process for displaying object icons in a manner of recessing the object icons sequentially according to one embodiment. In particular, FIGS. 13A to 13F shows a case that an increase rate of a recessed extent according to a time is constant (i.e., a slope/rate of change or a recessed speed is constant).

For clarity and convenience of the following description, assume that total two intermediate images are displayable. And, assume that a first intermediate image and a second intermediate image are displayable at points t/3 and 2t/3 of an execution time t of a switching operation, respectively. Of course, the number of intermediate images and display points are settable in various ways.

Figure 13A:
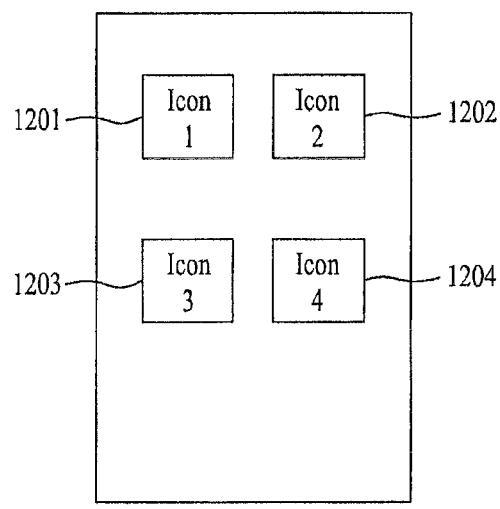
FIG. 13A to 13F are first diagrams of a recessed display process for displaying object icons sequentially.

Referring to FIGS. 13A to 13D, the mobile terminal 100 2-dimensionally displays an image including object icons 1 to 4 1201 to 1204 and is then able to perform a switching operation to a 3D recessed display on the object icon 1 1201 [FIG. 13A].

In this case, the switching operation can be executed if a user selects a key, key zone or menu item corresponding to a switching operation execution.

Figure 13B:
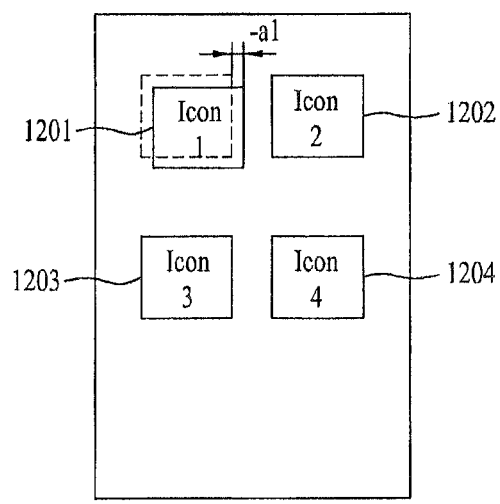

The mobile terminal 100 is able to 3-dimensionally display a first intermediate image, in which the object icon 1 1201 is recessed by −a1 at a point t/3 after an execution start of the switching operation [FIG. 13B]. And, the mobile terminal 100 is also able to 3-dimensionally display a second intermediate image, in which the object icon 1 1201 is recessed by −2a1 at a point 2t/3 after the execution start of the switching operation [FIG. 13C].

Figure 13C:
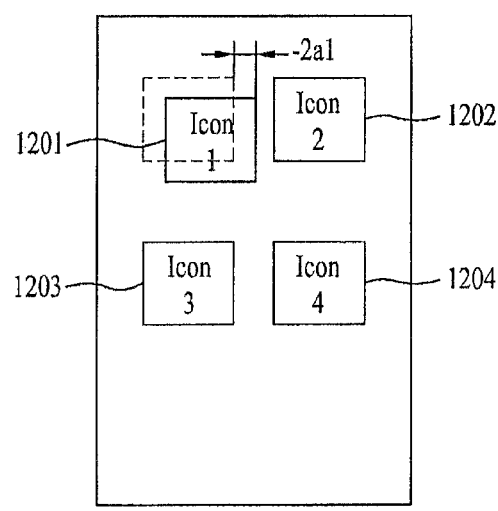
Figure 13D:
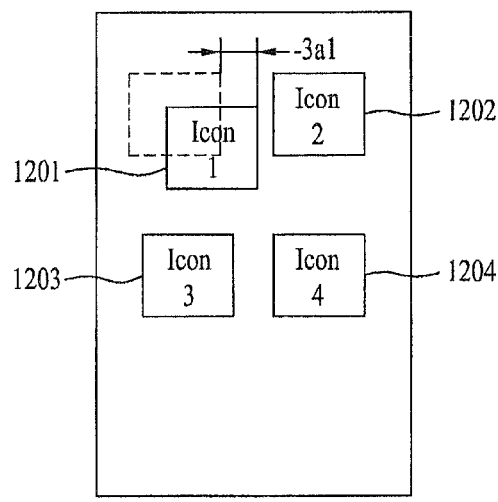

Moreover, the mobile terminal 100 is able to 3-dimensionally display an image, in which the object icon 1 1201 is recessed by −3a1 at a point of completion of the switching operation [FIG. 13D].

The process for performing or executing the switching operation shown in FIGS. 13A to 13D is described in further detail with reference to FIGS. 13E to 13F as follows.

Figure 13E:
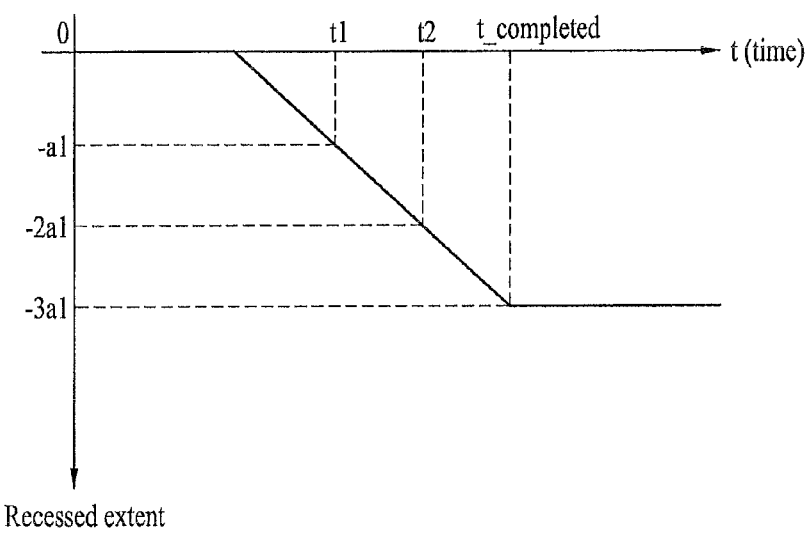

Referring to FIG. 13E, when a switching operation to a 3D recessed display is executed in the course of performing a 2D display, the object icon 1 1201 is recessed and displayed by −a1 at a point t/3 (=t1), the object icon 1 1201 is recessed and displayed by −2a1 at a point 2t/3 (=t2), and the object icon 1 1201 is recessed and displayed by −3a1 at a completion point t (=t_completed) of the switching operation. In particular, it can be observed that the recessed extent of the object icon 1 1201, which is the switching target object for the progress time of the switching operation, has a constant slope (e.g., rate of change).

A process for switching from a 3D recessed display to a 2D display is explained with reference to FIGS. 13A to 13D and FIGS. 13E to 13F as follows. For clarity and convenience of the following description, assume that the object icon 1 in the 3D recessed display is initially displayed in a manner of being recessed by −3a1, as shown in FIG. 13D.

First of all, the mobile terminal 100 is able to 3-dimensionally display the first intermediate image in which the object icon 1 1201 is recessed by −2a1 (reduced by −a1 smaller than that of the 3D recessed display) at a point t/3 after an execution start of the switching operation [cf. FIG. 13C]. And, the mobile terminal 100 is able to 3-dimensionally display the second intermediate image in which the object icon 1 1201 is recessed by −a1 (i.e., reduced by −2a1 smaller than that of the 3D recessed display) at a point 2t/3 after an execution start of the switching operation [cf. FIG. 13B].

Moreover, the mobile terminal 100 is able to 2-dimensionally display an image including the object icon 1 1201 (recessed extent=0) at a point of completion of the switching operation [cf. FIG. 13A].

Figure 13F:
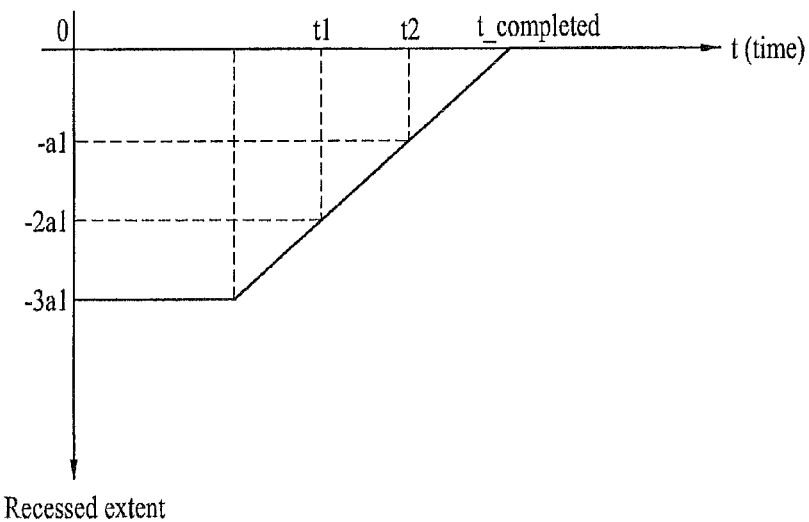

Referring to FIG. 13F, when a switching operation to a 2D display is executed in the course of performing a 3D recessed display, the object icon 1 1201 is recessed and displayed by −2a1 at a point t/3 (=t1), the object icon 1 1201 is recessed and displayed by −a1 at a point 2t/3 (=t2), and the object icon 1 1201 is 2-dimensionally displayed at a completion point t (=t_completed) of the switching operation in a manner of not being recessed.

FIGS. 14A to 14H are diagrams of a process for projecting and displaying object icons sequentially according to one embodiment. In particular, FIGS. 14A to 14H show a case that an increase rate of a projected extent is gradually increasing (e.g., a slope/rate of change becomes steep or a projected speed increases).

For clarity and convenience of the following description, assume that total four intermediate images are displayable. And, assume that a first intermediate image, a second intermediate image, a third intermediate image and a fourth intermediate image are displayable at points t/5, 2t/5, 3t/5 and 4t/5 of an execution time t of a switching operation, respectively. Of course, the number of intermediate images and display points are settable in various ways.

Referring to FIGS. 14A to 14F, the mobile terminal 100 2-dimensionally displays an image including object icons 1 to 4 1201 to 1204 and is then able to perform a switching operation to a 3D projected display on the object icon 1 1201.

In this case, the switching operation can be executed if a user selects a key, key zone or menu item corresponding to a switching operation execution.

Figure 14A:
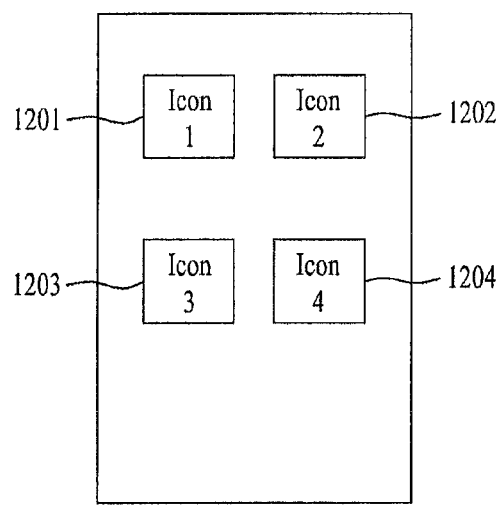
FIGS. 14A to 14H are second diagrams of a projected display process for displaying object icons sequentially.
Figure 14B:
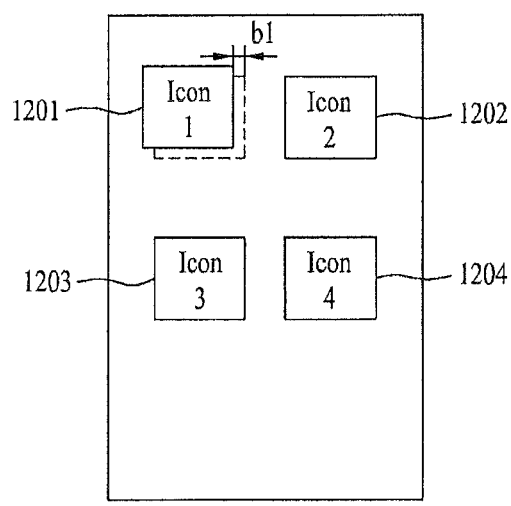

The mobile terminal 100 is able to 3-dimensionally display a first intermediate image, in which the object icon 1 1201 is projected by b1 at a point t/5 after an execution start of the switching operation [FIG. 14B]. And, the mobile terminal 100 is also able to 3-dimensionally display a second intermediate image, in which the object icon 1 1201 is projected by b2 at a point 2t/5 after the execution start of the switching operation [FIG. 14C]. The mobile terminal 100 is able to 3-dimensionally display a third intermediate image, in which the object icon 1 1201 is projected by b3 at a point 3t/5 after the execution start of the switching operation [FIG. 14D]. And, the mobile terminal 100 is also able to 3-dimensionally display a fourth intermediate image, in which the object icon 1 1201 is projected by b4 at a point 4t/5 after the execution start of the switching operation [FIG. 14E].

In this case, (b2−b1) (i.e., an increase rate of a projected extent in t/5~2t/5) is greater than b1 (i.e., an increase rate of a projected extent in 0~t/5), which means that a slope at 2t/5 is steeper than that at t/5. And, (b3−b2) (i.e., a change in the projected extent from t=2t/5 to t=3t/5) is greater than (b2−b1), which means that a slope at 3t/5 is steeper than that at 2t/5. Moreover, (b4−b3) (i.e., a change in the projected extent from t=3t/5 to t=4t/5) is greater than (b3−b2).

Figure 14C:
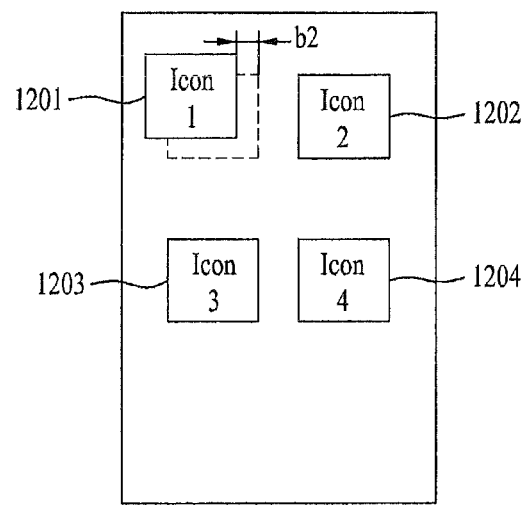
Figure 14D:
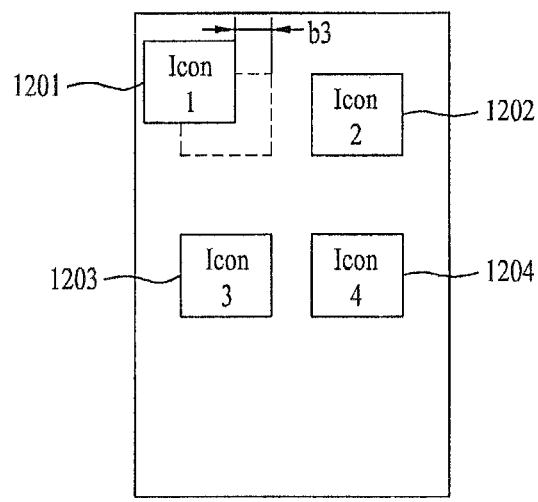
Figure 14E:
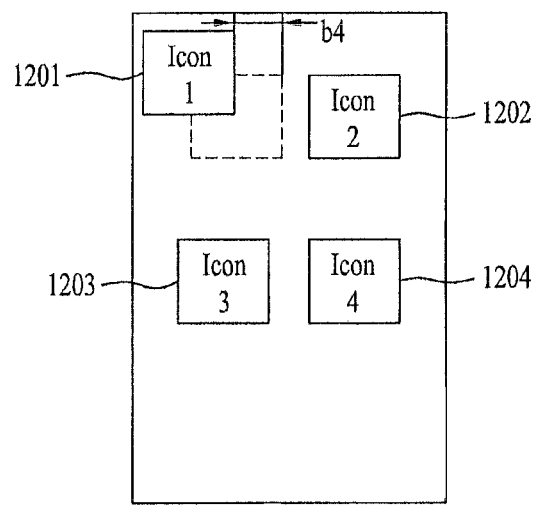
Figure 14F:
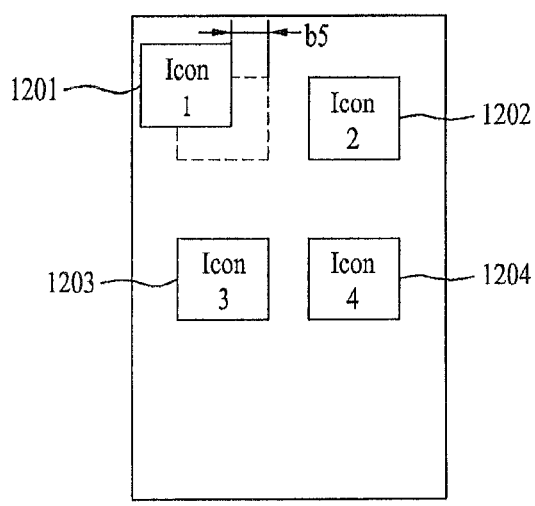

Moreover, the mobile terminal 100 is able to 3-dimensionally display an image, in which the object icon 1 1201 is projected by b5 at a point t at which the switching operation is completed [FIG. 14F].

In this case, b5 may be a projected extent which may be smaller than b4. So to speak, the switching operation can be completed in a manner that the object icon 1 1201 reaches a maximum projected extent before the completion point of the switching operation and its projected extent is then reduced to a prescribed extent. Therefore, the projected display operation for the object icon 1201 is elastically or flexibly displayable according to the completion point. Of course, this operation to provide the graphic effect of the elastically projecting the displayed object may be performed selectively.

The process for performing or executing the switching operation shown in FIGS. 14A to 14C is described in further detail with reference to the graphs of FIGS. 14G to 14H as follows.

Figure 14G:
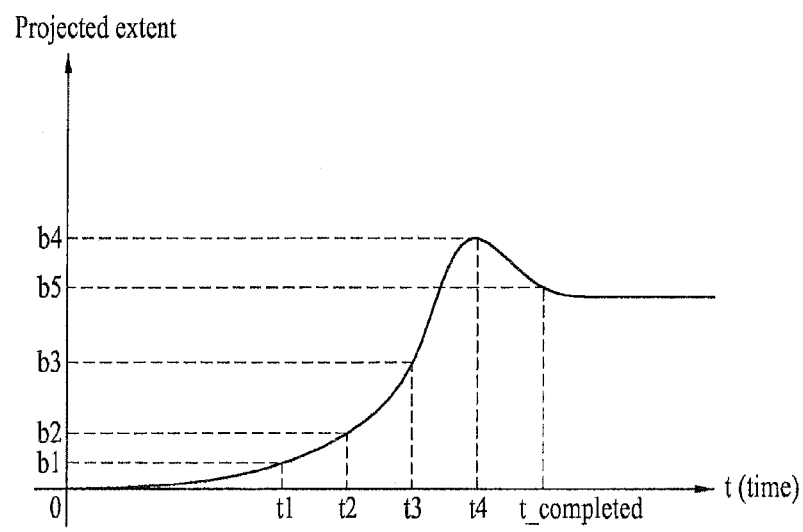

Referring to FIG. 14G, when a switching operation to a 3D projected display is executed in the course of performing a 2D display, the object icon 1 1201 is projected and displayed by b1 at a point t/5 (=t1), the object icon 1 1201 is projected and displayed by b2 [(b2−b1)>b1] at a point 2t/5 (=t2), the object icon 1 1201 is projected and displayed by b3 [(b3−b2)>(b2−b1)] at a point 3t/5 (=t3), the object icon 1 1201 is projected and displayed by b4 [(b4−b3)>(b3−b2)] at a point 4t/5 (=t4), and the object icon 1 1201 is projected and displayed by b5 [b5<b4] at a point t (=t_completed) of completion of the switching operation.

In particular, it can be observed that the projected extent of the object icon 1 1201, which is the switching target object for the progress time of the switching operation, becomes steeper gradually according to elapse of time. Moreover, since the projected extent b4 of the last displayed object icon 1 1201 is greater than the projected extent b5 of the object icon 1 1201 displayed at the completion of the switching operation, a user can view the object icon 1 as if the object icon 1 is elastically projected and displayed.

A process for switching from a 3D projected display to a 2D display is explained with reference to FIGS. 14A to 14G as follows. For clarity and convenience of the following description, assume that the object icon 1 in the 3D projected display is initially displayed in a manner of being projected by b5, as shown in FIG. 14F.

First of all, the mobile terminal 100 is able to 3-dimensionally display the first intermediate image in which the object icon 1 1201 is projected by b4 at a point t/5 (=t1) after an execution start of the switching operation [cf. 14E], the mobile terminal 100 is able to 3-dimensionally display the second intermediate image in which the object icon 1 1201 is projected by b3 at a point 2t/5 (=t2) after an execution start of the switching operation [cf. FIG. 14D], the mobile terminal 100 is able to 3-dimensionally display the third intermediate image in which the object icon 1 1201 is projected by b2 at a point 3t/5 (=t3) after an execution start of the switching operation [cf. FIG. 14C], and the mobile terminal 100 is able to 3-dimensionally display the fourth intermediate image in which the object icon 1 1201 is projected by b1 at a point 4t/5 (=t4) after an execution start of the switching operation [cf. FIG. 14B].

Moreover, the mobile terminal 100 is able to 2-dimensionally display an image including the object icon 1 1201 (projected extent=0) at a point t (=t_completed) of completion of the switching operation [cf. FIG. 14A].

Figure 14H:
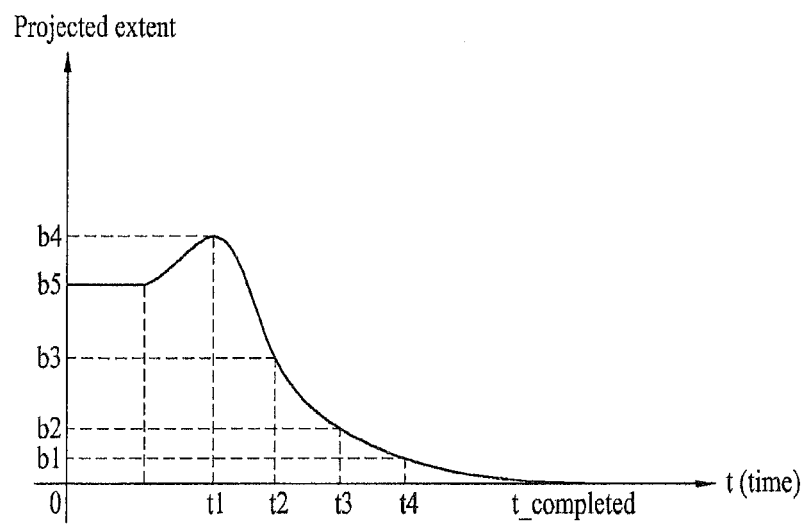

A graph indicating a projected extent for a progress time of the switching operation corresponding to the process for switching to the 2D display from the 3D projected display is shown in FIG. 14H.

FIGS. 15A to 15H are diagrams of a process for recessing and displaying object icons sequentially according to one embodiment. In particular, FIGS. 15A to 15F show a case that an increase rate of a recessed extent is gradually increasing (e.g., a slope/rate of change becomes steep or a recessed speed increases).

For clarity and convenience of the following description, assume that total of four intermediate images are displayable. And, assume that a first intermediate image, a second intermediate image, a third intermediate image and a fourth intermediate image are displayable at points t/5, 2t/5, 3t/5 and 4t/5 of an execution time t of a switching operation, respectively. Of course, the number of intermediate images and display points are settable in various ways.

Referring to FIGS. 15A to 15F, the mobile terminal 100 2-dimensionally displays an image including object icons 1 to 4 1201 to 1204 and is then able to perform a switching operation to a 3D recessed display on the object icon 1 1201.

In this case, the switching operation can be executed if a user selects a key, key zone or menu item corresponding to a switching operation execution.

Figure 15A:
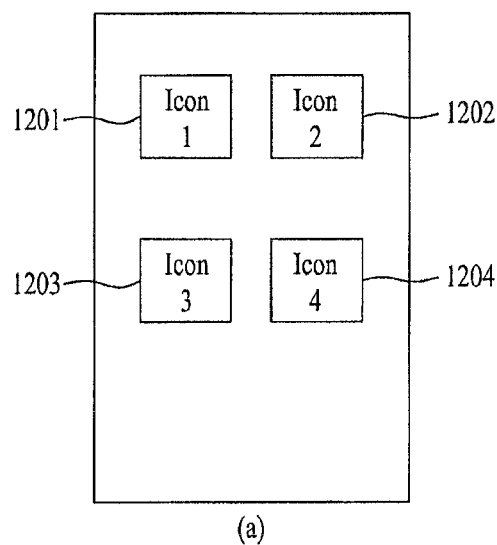
FIGS. 15A to 15H are second diagrams of a recessed display process for displaying object icons sequentially.
Figure 15B:
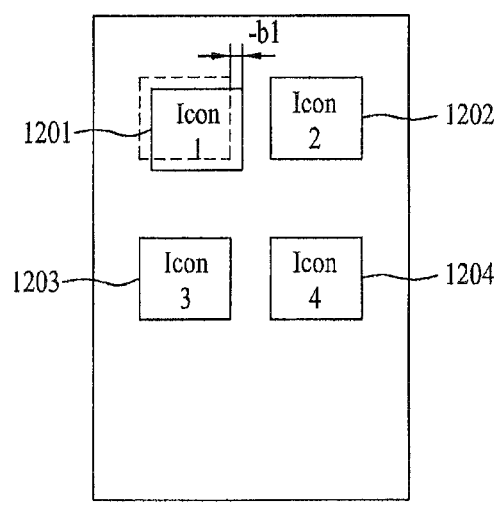

The mobile terminal 100 is able to 3-dimensionally display a first intermediate image, in which the object icon 1 1201 is recessed by −b1 at a point t/5 after an execution start of the switching operation [FIG. 15B]. And, the mobile terminal 100 is also able to 3-dimensionally display a second intermediate image, in which the object icon 1 1201 is recessed by −b2 at a point 2t/5 after the execution start of the switching operation [FIG. 15C]. The mobile terminal 100 is able to 3-dimensionally display a third intermediate image, in which the object icon 1 1201 is recessed by −b3 at a point 3t/5 after the execution start of the switching operation [FIG. 15D]. And, the mobile terminal 100 is also able to 3-dimensionally display a fourth intermediate image, in which the object icon 1 1201 is recessed by −b4 at a point 4t/5 after the execution start of the switching operation [FIG. 15E].

In this case, |−2−(−b1)| (i.e., an increase rate of a recessed extent in t/5~2t/5) is greater than |−b1| (i.e., a change in the recessed extent from t=0 to t=t/5), which means that a slope at 2t/5 is steeper than that at t/5. And, |−b3−(−b2)| (i.e., a change in the recessed extent from t=2t/5 to t=3t/5) is greater than |−b2−(−b1)|, which means that a slope at 3t/5 is steeper than that at 2t/5. Moreover, |−b4−(−b3)| (i.e., a change in the recessed extent in from t=3t/5 to t=4t/5) is greater than |−b3−(−b2)|.

Figure 15C:
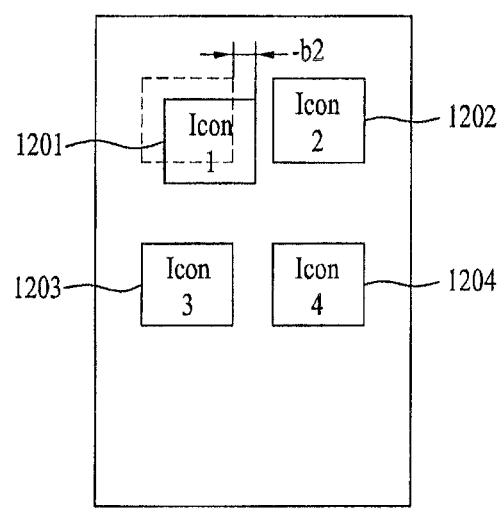
Figure 15D:
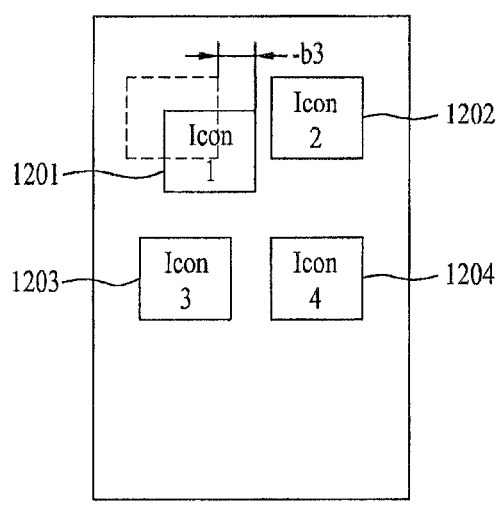
Figure 15E:
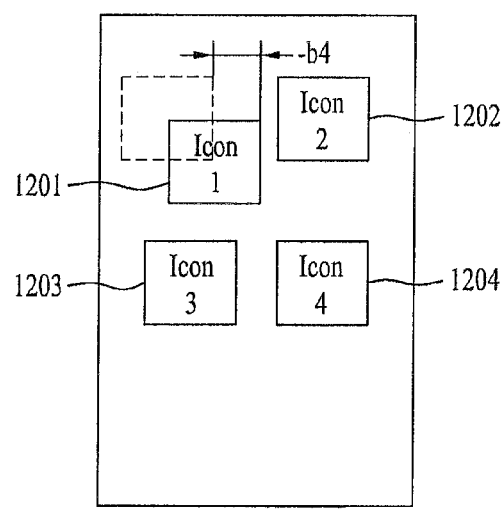
Figure 15F:
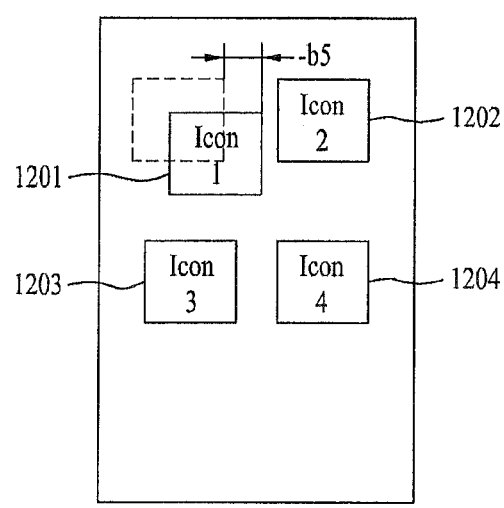

Moreover, the mobile terminal 100 is able to 3-dimensionally display an image, in which the object icon 1 1201 is recessed by −b5 at a time t at which the switching operation is completed [FIG. 15F].

In this case, |−b5| may be a recessed extent smaller than |−b4|. So to speak, the switching operation can be completed in a manner that the object icon 1 1201 reaches a maximum recessed extent before the completion point of the switching operation and its projected extent is then reduced to a prescribed extent. Therefore, the recessed display operation for the object icon 1201 is elastically or flexibly displayable according to the completion point. Of course, the display operation to create the graphic effect of elastically recessing the displayed object may be performed selectively.

The process for performing or executing the switching operation shown in FIGS. 15A to 15F is described in further detail with reference to the graphs of FIG. 15D as follows.

Figure 15G:
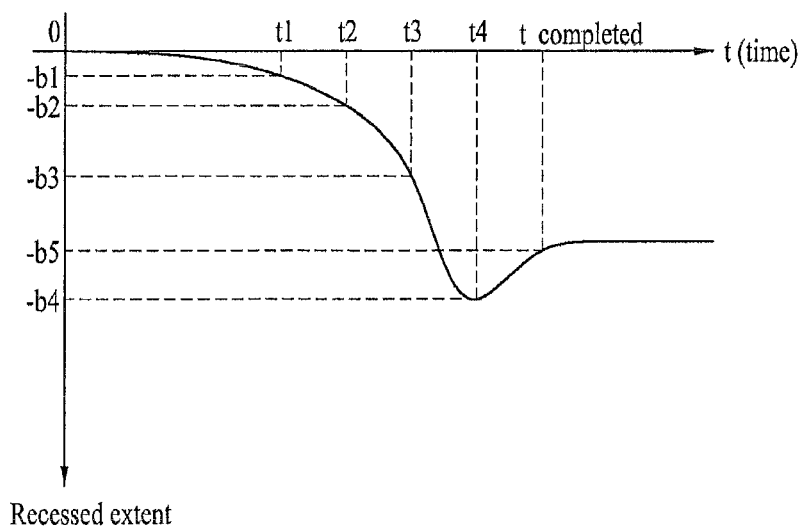

Referring to FIG. 15G, when a switching operation to a 3D recessed display is executed in the course of performing a 2D display, the object icon 1 1201 is recessed and displayed by −b1 at a point t/5 (=t1), the object icon 1 1201 is recessed and displayed by −b2 [|−b2−(−b1)|>|−b1|] at a point 2t/5 (=t2), the object icon 1 1201 is recessed and displayed by −b3 [|−b3−(−b2)|>|−b2−(−b1)|] at a point 3t/5 (=t3), the object icon 1 1201 is recessed and displayed by −b4 [|−b4−(−b3)|>|−b3−(−b2)|] at a point 4t/5 (=t4), and the object icon 1 1201 is recessed and displayed by −b5 [|−b5|<|−b4|] at a point t (=t_completed) of completion of the switching operation.

In particular, it can be observed that the recessed extent of the object icon 1 1201, which is the switching target object for the progress time of the switching operation, becomes steeper gradually according to elapse of time. Moreover, since the recessed extent |−b4| of the last displayed object icon 1 1201 is greater than the recessed extent |−b5| of the object icon 1 1201 displayed at the completion of the switching operation, a user can view the object icon 1 as if the object icon 1 is elastically recessed and displayed.

A process for switching from a 3D recessed display to a 2D display is explained with reference to FIGS. 15A to 15H as follows. For clarity and convenience of the following description, assume that the object icon 1 in the 3D projected display is initially displayed in a manner of being recessed by −b5, as shown in FIG. 15F.

First of all, the mobile terminal 100 is able to 3-dimensionally display the first intermediate image in which the object icon 1 1201 is recessed by −b4 at a point t/5 (=t1) after an execution start of the switching operation [cf. FIG. 15E], the mobile terminal 100 is able to 3-dimensionally display the second intermediate image in which the object icon 1 1201 is recessed by −b3 at a point 2t/5 (=t2) after an execution start of the switching operation [cf. FIG. 15D], the mobile terminal 100 is able to 3-dimensionally display the third intermediate image in which the object icon 1 1201 is recessed by −b2 at a point 3t/5 (=t3) after an execution start of the switching operation [cf. FIG. 15C], and the mobile terminal 100 is able to 3-dimensionally display the fourth intermediate image in which the object icon 1 1201 is recessed by −b1 at a point 4t/5 (=t4) after an execution start of the switching operation [cf. FIG. 15B].

Moreover, the mobile terminal 100 is able to 2-dimensionally display an image including the object icon 1 1201 (recessed extent=0) at a point t (=t_completed) of completion of the switching operation [cf. FIG. 15A].

Figure 15H:
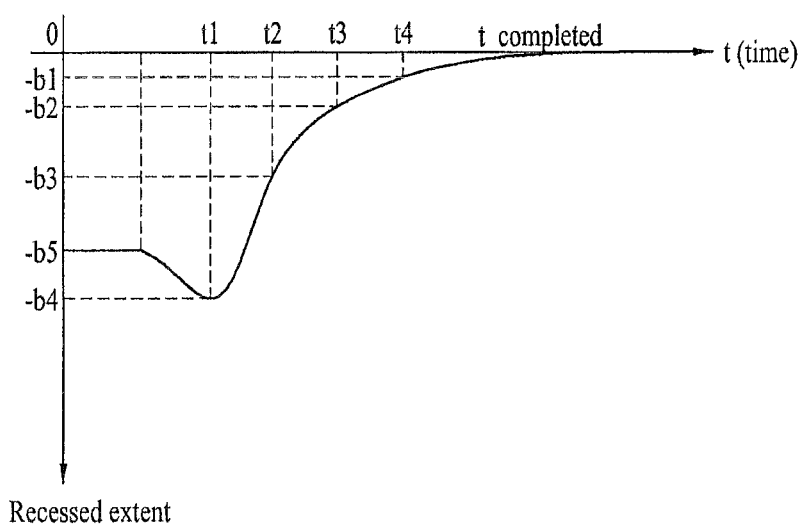

A graph indicating a recessed extent for a progress time of the switching operation corresponding to the process for switching to the 2D display from the 3D recessed display is shown in FIG. 15H.

Although the intermediate image displaying process for the switching operation between the 2D display and the 3D display is disclosed in the present specification, the above-described intermediate image displaying process is applicable to a switching operation between 1D/3D display and 2D/3D display. In this case, an image projected/recessed extent in each of the 1D to 3D displays may be different.

The 2D display mentioned in the present specification includes a state that left and right eye images are displayed in a 3D display in a manner of being overlapped with each other at the same point (i.e., a state that a 3D display function is activated) or a state that the 3D display function is deactivated. In particular, the 2D display is mainly focused on a case that an image is externally displayed in two dimensions.

According to the present disclosure, the mobile terminal 100 is able to receive an input of a selection action for selecting the number of intermediate images displayed in the course of a switching operation an input of a selection action of a projected or recessed extent of each of the intermediate images from a user via the user input unit 130. Therefore, the controller 180 is able to set the intermediate image number and the projected or recessed extent to correspond to the inputted selection actions.

In the following description, a method of controlling an image display in a mobile terminal according to a second embodiment is explained with reference to FIGS. 16 to 31.

Figure 16:
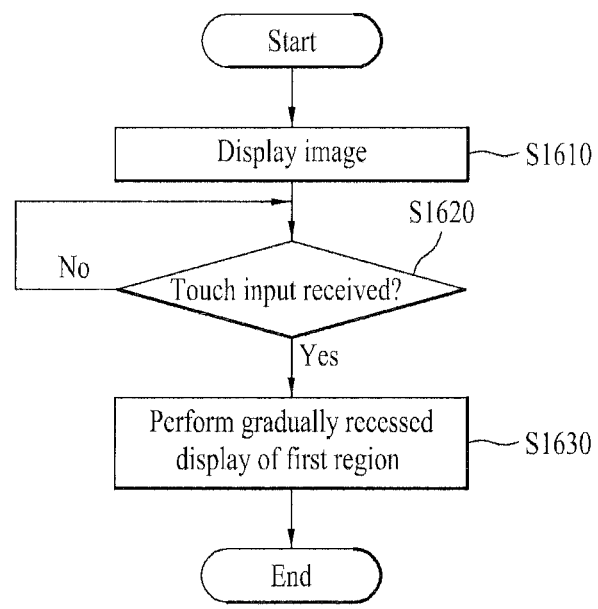
FIG. 16 is a flowchart of an image display controlling method of a mobile terminal according to a second embodiment.

FIG. 16 is a flowchart of an image display controlling method of a mobile terminal according to a second embodiment.

In the following description, the display unit 151 may include a touchscreen.

Referring to FIG. 16, the mobile terminal 100 displays an image on the touchscreen under the control of the controller 180 [S1610]. In this case, the controller 180 is able to display the mage 3-dimensionally using one of the above mentioned stereoscopic image displaying methods (cf. FIG. 5 and FIG. 6). As this image is displayed, a user is able to observe a stereoscopic image by the stereoscopic effect attributed to binocular parallax.

Afterwards, in case of receiving an input of a touch action performed on a first point in the displayed image [S1620], the mobile terminal obtains a first region including the first point having the touch action inputted thereto and is then able to control the touchscreen to display the obtained first region in a manner of recessing the corresponding region gradually [S1630].

In the following description, an image, of which whole or partial part is 3-dimensionally displayed, shall be named a stereoscopic image. Moreover, an image display plane, which is recognized by a user that a 3D display is performed thereon, shall be named a virtual display plane. In this case, the virtual display plane is different from a display plane on which a real image is displayed.

Figure 17:
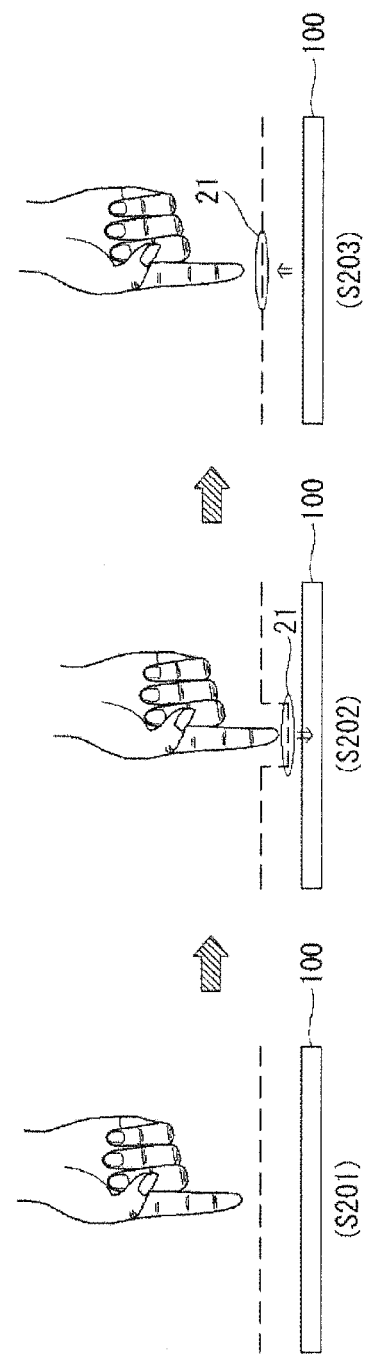
FIG. 17 is a diagram for one example of modifying a stereoscopic image in a mobile terminal according to a second embodiment.

FIG. 17 is a diagram for one example of modifying a stereoscopic image in a mobile terminal according to the second embodiment of the present disclosure. And, FIGS. 18 to 21 are diagrams for describing FIG. 17.

Referring to FIG. 17, the mobile terminal 100 receives an input of a touch action performed on a first point by a proximity or contact touch while a stereoscopic image is being displayed on the touchscreen [S201].

Accordingly, the controller 180 obtains a first region 21 including the first point touched by a user in a virtual display plane and is then able to control the touchscreen to perform a recessed display on all of the obtained region 21 [S202]. In particular, the controller 180 is able to control a plurality of pixels, which are included in the partial display plane, to provide a user with a stereoscopic effect enabling the user to sense that the partial display plane (i.e., this plane corresponds to the first region 21) of the stereoscopic image is descending (or being recessed).

Meanwhile, the controller 180 is able to implement a stereoscopic view for descending or recessing the first region 21 of the virtual display plane in various ways.

For instance, the controller 180 is able to implement the stereoscopic view for descending the first region 21 in a manner of adjusting a binocular parallax value by shifting at least one of a plurality of the pixels corresponding to the first region 21. In this case, as the binocular parallax value is changed, a user feels a different sense of height of the first region 21.

For another instance, the controller 180 is able to implement the stereoscopic view for descending the first region 21 by controlling a depth value of a plurality of the pixels corresponding to the first region 21. In this case, the controller 180 controls the depth value by adjusting a brightness, a chroma or the like of each pixel. As the pixel depth value varies, the user is able to psychologically sense that the stereoscopy effect is changed.

Figure 18:
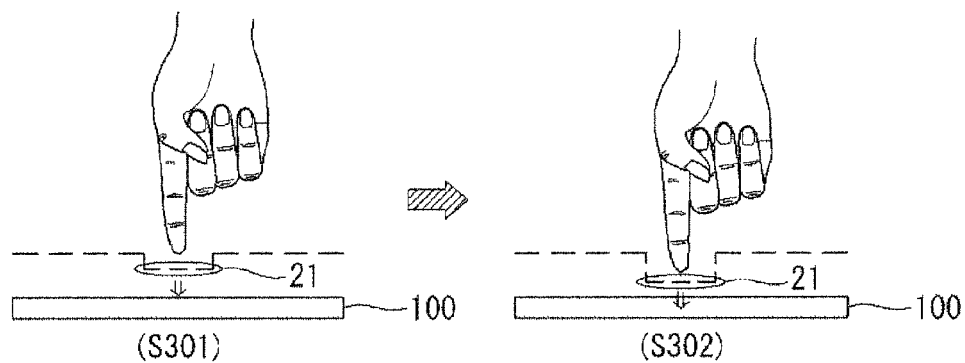
FIGS. 18 to 21 are diagrams for describing FIG. 17.

Meanwhile, in the aforesaid step S202, the controller 180 is able to control a descending height of the first region 21 to vary according to a depth of proximity touch (i.e., a proximity depth). Referring to FIG. 18, the controller 180 is able to control the touchscreen in a following manner. First of all, as a proximity-touched point gets closer to a first point (i.e., a proximity touch distance is reduced), a descending extent of the first region 21 gradually increases [S301, S302]. Accordingly, a user is able to sense the stereoscopic effect of gradual descent by a finger pressing action. FIG. 18 exemplarily shows the case that the descending extent varies according to the proximity depth to explain the corresponding embodiment, by which the present disclosure is non-limited. Alternatively, the controller 180 of the present disclosure is able to differently vary the descending height according to such a condition as a touch pressure, a touch duration, and the like as well as the proximity touch. In particular, as the touch pressure increases higher or the touch duration gets longer, the descending extent can be raised higher.

FIG. 17 and FIG. 18 show the case that a size of the first region 21 is constant irrespective of the descending extent to explain the corresponding embodiment, by which the present disclosure is non-limited. Alternatively, the present disclosure can include a case that the size of the first region 21 gets increased or decreased according to the descending extent.

Referring now to FIG. 17, after the first region 21 of the virtual display plane has been descended by the input of the touch action performed on the first point, if the touch action is removed, the controller 180 is able to reconstruct the stereoscopic image into the state prior to the input of the touch action on the first point [S203]. In particular, the controller 180 is able to reconstruct the depth values or positions of a plurality of the pixels corresponding to the descending first region 21 into the state prior to the reception of the touch input. Accordingly, since the touch action is removed from the partial virtual display plane descended by the touch action, the user is able to observe the reconstruction into the state before the descent.

Figure 19:
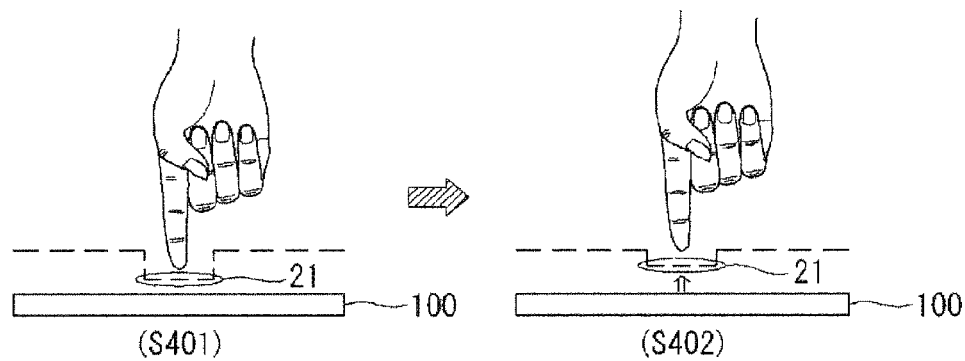

In this case, the controller 180 is able to implement a stereoscopic view which shows that the virtual display plane is gradually reconstructed due to the gradual ascent of the descending first region 21. Referring to FIG. 19, the controller 180 implements the stereoscopic view in a following manner. First of all, as the proximity-touched point gets more distant from the first point (i.e., a proximity touch distance increases), the descending first region 21 gradually ascends [S401, S402]. Accordingly, as the touch action is removed from the first region 21 which has descended by the touch action, the user is able to observe that the first region 21 gradually ascends and is then reconstructed into the state before the corresponding descent.

Meanwhile, in the aforesaid step S202, in case of receiving a touch action on the first point, the controller 180 is able to obtain the first region 21 including the first point in various ways.

Figure 20:
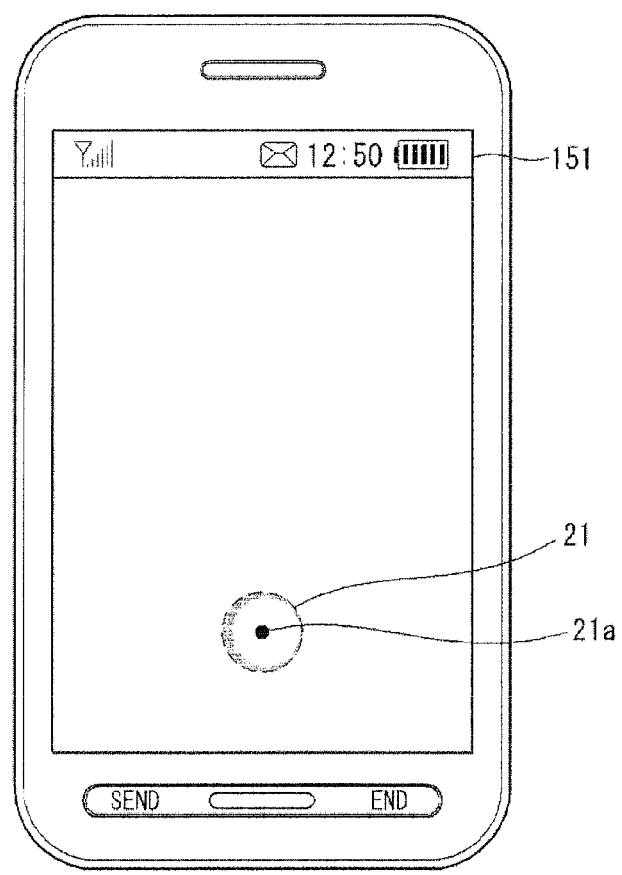

For instance, referring to FIG. 20, a region including a plurality of pixels located within a predetermined distance with reference to a first point 21a touched by a user can be obtained as a first region 21 by the controller 180. In this case, the controller 180 is able to obtain the first region 21 in one of various shapes including a circle, a rectangle, a lozenge or rhombus, a triangle, a heart and the like.

Figure 21:
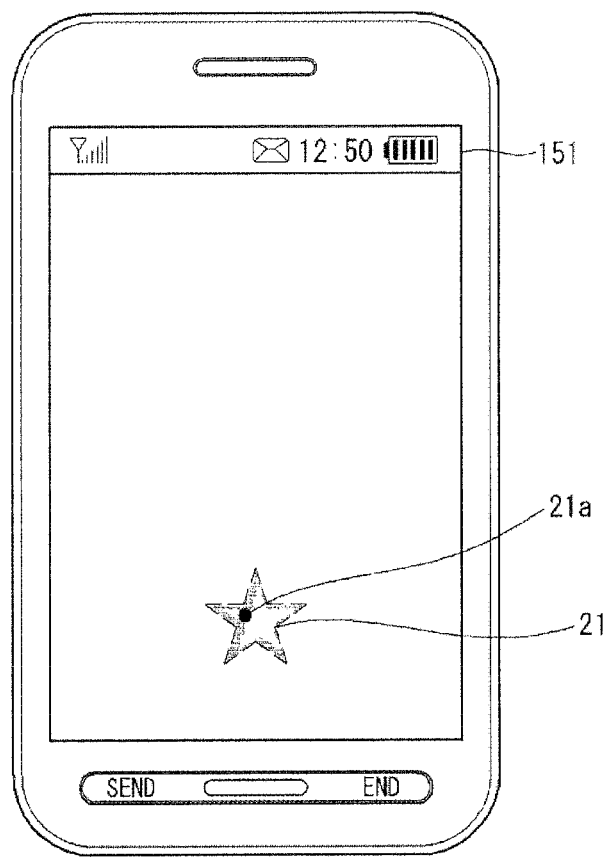

For another instance, referring to FIG. 21, in case that a first point 21a is included in a specific object, a region including the first object therein can be obtained as a first region 21 by the controller 180. In this case, the object may refer to an object in one of various shapes displayed in a stereoscopic image and the image can include one of a human, a thing, a button, an icon, a thumbnail, a text and the like.

Figure 22:
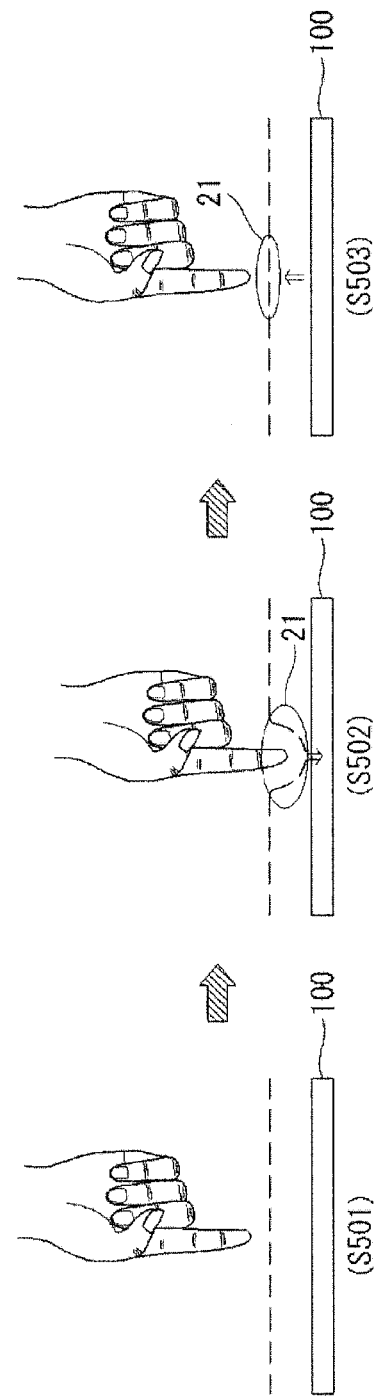
FIG. 22 is a diagram for another example of modifying a stereoscopic image in a mobile terminal according to a second embodiment.
Figure 23:
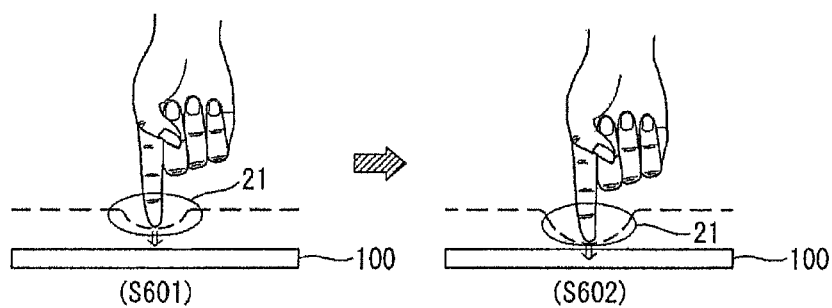
FIG. 23 and FIG. 24 are diagrams for describing FIG. 22.
Figure 24:
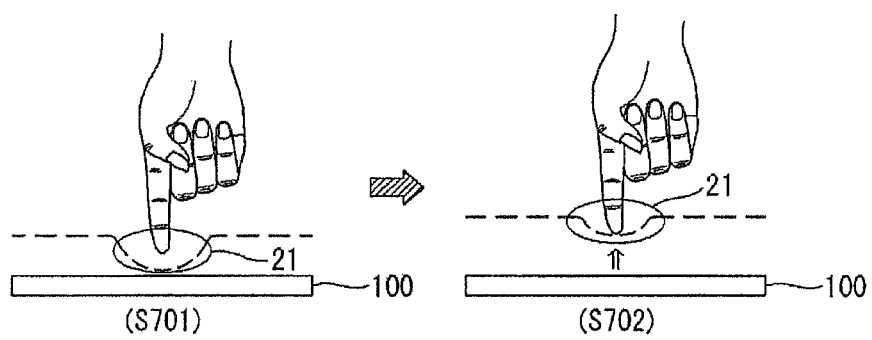

FIG. 22 is a diagram for another example of modifying a stereoscopic image in a mobile terminal according to the second embodiment, and FIG. 23 and FIG. 24 are diagrams for describing FIG. 22.

Referring to FIG. 22, the mobile terminal 100 receives an input of a touch action performed on a first point by a proximity or contact touch while a stereoscopic image is being displayed on the touchscreen [S501].

Accordingly, the controller 180 obtains a first region 21 including the touch action inputted first point in a virtual display plane and is then able to control the obtained first region 21 to be displayed in a manner of being recessed or descending [S502]. In particular, the controller 180 is able to control a plurality of pixels, which are included in the first region 21, to implement a stereoscopic view for varying a recessed extent according to a distance between the touched first point and each of the pixels included in the obtained first region 21.

For instance, referring to FIG. 22, the controller 180 is able to implement the stereoscopic view in a following manner. First of all, as a virtual display plane of the obtained first region 21 gets more distant from the touch point, it has a gradually ascending curved plane. For another instance, the controller 180 is able to implement the stereoscopic view in a following manner. First of all, as a virtual display plane of the obtained first region 21 ascends by a plurality of steps according to a distance from the touch point. In this case, the controller 180 divides a descending extent into a plurality of levels and is then able to select a corresponding descending extent level according to a distance between the touch point and the virtual display plane.

Meanwhile, in the aforesaid step S502, the controller 180 is able to control a descending extent of the first region 21 to vary according to a depth of proximity touch (i.e., a proximity depth). Referring to FIG. 23, the controller 180 is able to set the descending extent to gradually increase if the proximity-touched point gets closer to the first point [S601, S602].

Moreover, referring to FIG. 23, the controller 180 is able to implement a stereoscopic view in a following manner. First of all, as the proximity-touched point gets closer to the first point, a size of the descending first region 21 gradually increases more.

Referring now to FIG. 23, after the first region 21 of the virtual display plane has been descended by the input of the touch action performed on the first point, if the touch action is removed, the controller 180 is able to reconstruct the stereoscopic image into the state prior to the input of the touch action on the first point [S503]. In particular, the controller 180 is able to reconstruct the depth values or positions of a plurality of the pixels corresponding to the descending first region 21 into the state prior to the reception of the input of the touch action. Accordingly, since the touch action is removed from the partial virtual display plane descended by the touch action, the user is able to observe the reconstruction into the state before the descent.

In this case, the controller 180 is able to implement a stereoscopic view which shows that the virtual display plane is gradually reconstructed due to the gradual ascent of the descending first region 21. Referring to FIG. 24, the controller 180 is able to implement the stereoscopic view in a following manner. First of all, as the proximity-touched point gets more distant from the first point, the descending first region 21 gradually ascends [S701, S702]. Moreover, referring to FIG. 24, the controller 180 is able to implement the stereoscopic view in a following manner. First of all, as the proximity-touched point gets more distant from the first point, the descending first region 21 gradually becomes narrowed.

Figure 25:
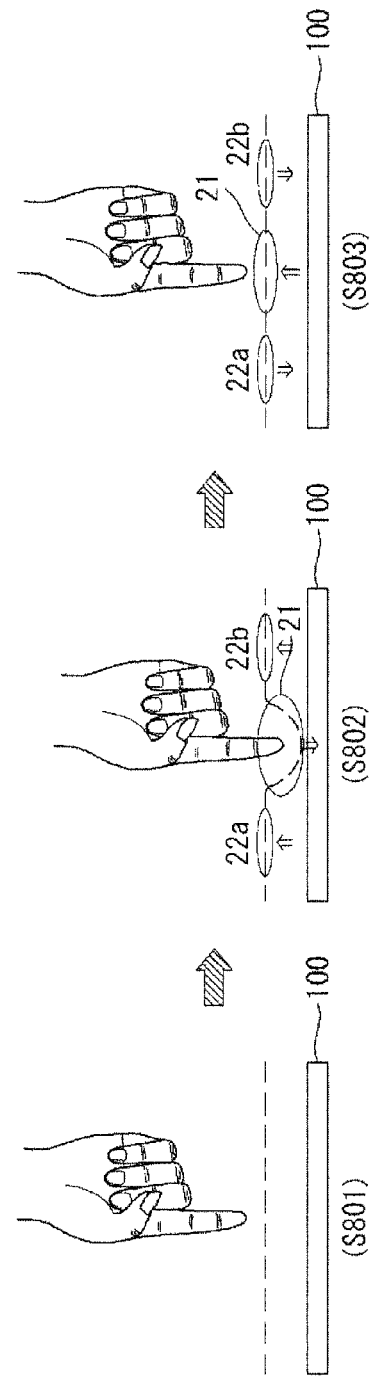
FIG. 25 is a diagram for a further example of modifying a stereoscopic image in a mobile terminal according to a second embodiment.
Figure 26:
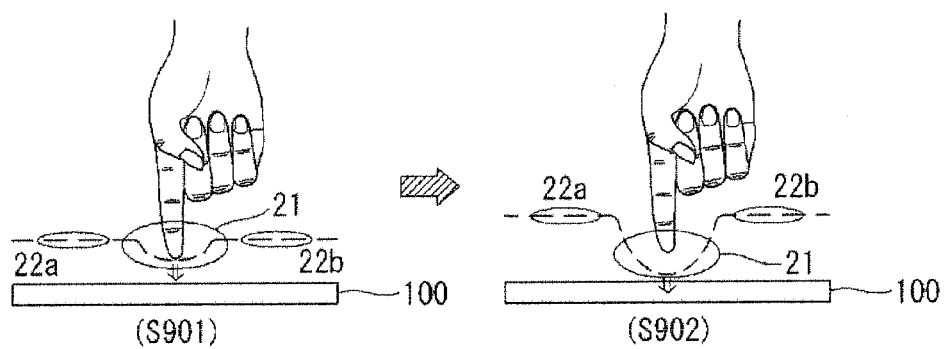
FIG. 26 and FIG. 27 are diagrams for describing FIG. 25.
Figure 27:
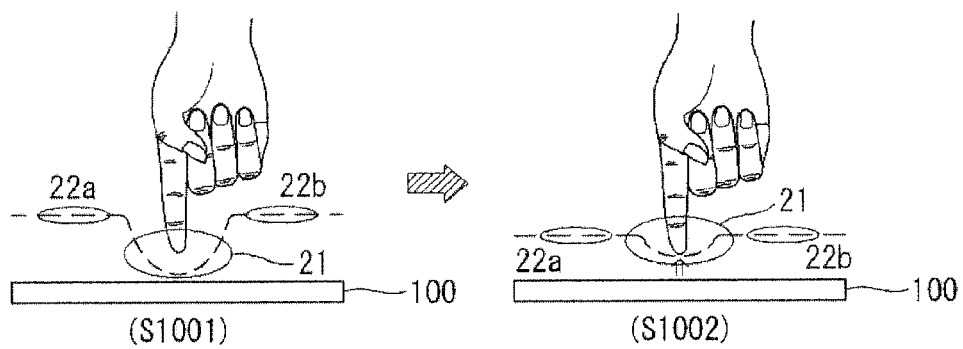

FIG. 25 is a diagram for a further example of modifying a stereoscopic image in a mobile terminal according to a second embodiment, and FIG. 26 and FIG. 27 are diagrams for describing FIG. 25.

Referring to FIG. 25, while a stereoscopic image is being displayed on the touchscreen [S801], the mobile terminal 100 receives an input of a touch action on a first point.

Accordingly, the controller 180 performs a recessed display on a first region 21 including the first point in a virtual display plane of the stereoscopic image and is able to perform a projected display on the rest of regions 22a and 22b except the descending first region 21 corresponding to the recessed display of the first region 21 [S802].

In this case, the controller 180 is able to implement a stereoscopic view according to a distance between the first point and a corresponding pixel in a manner that the first region becomes recessed gradually or the rest regions 22a and 22b become projected gradually. Referring to FIG. 26, as a proximity-touch point gets closer to the first point, the controller 180 implements the stereoscopic view in a manner of gradually recessing the first region 21 including the first point and enabling the rest regions 22a and 22b except the first region 21 to ascend gradually [S901, S902]. Meanwhile, FIG. 26 exemplarily shows a case that all of the rest regions except the descending first region 21 ascend gradually, by which the present disclosure is non-limited. Alternatively, the present disclosure is also able to control the stereoscopic view in a manner that a partial region enclosing the first region 21 is made to ascend gradually. In this case, an ascending height of the ascending region may be constant irrespective of a position or can vary according to a distance from the first region 21.

Referring again to FIG. 25, when the first region 21 selected by the proximity touch ascends, while the regions 22a and 22b enclosing the first region 21 descend or ascend, if the touch action is removed, the controller 180 reconstructs the stereoscopic image into the state before the input of the touch action [S803]. In particular, the controller 180 is able to reconstruct the stereoscopic image into the state before the input of the touch action in a manner of ascending the descending first region 21 ascend and descending the ascending rest regions 22a and 22b.

In this case, the controller 180 is able to implement a stereoscopic view reconstructed into a previous state in a manner that each of the regions 21, 22a and 22b gradually ascends or descends according to a depth of the proximity touch, i.e., a proximity depth. Referring to FIG. 27, the controller 180 is able to implement the stereoscopic view in a manner of gradually projecting the descending first region 21 and gradually recessing the ascending rest regions 22a and 22b, as the proximity touch point gets more distant from the first point [S1001, S1002].

Figure 28:
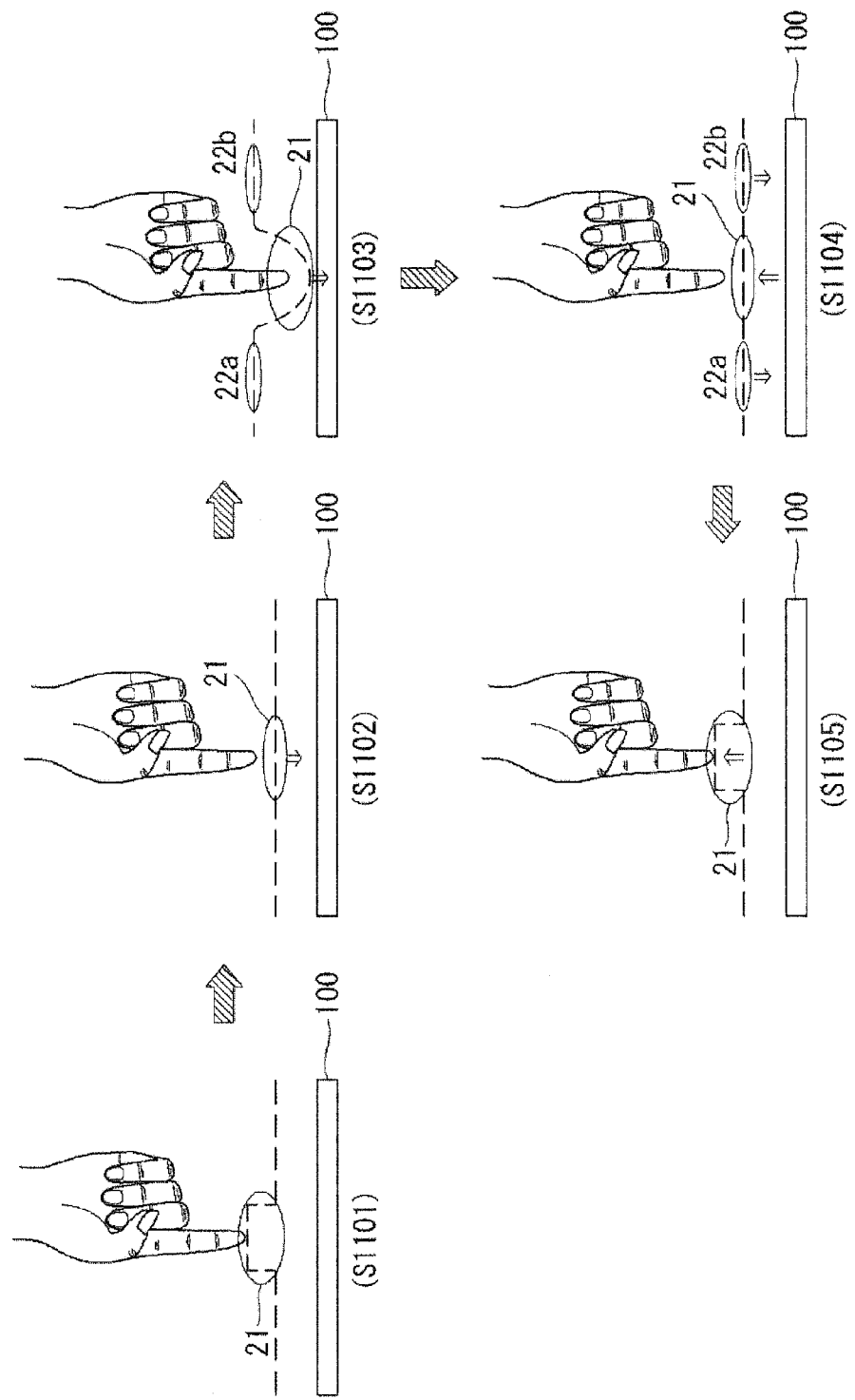
FIGS. 28 to 31 are diagrams for another further examples of modifying a stereoscopic image in a mobile terminal according to a second embodiment.

FIG. 28 is a diagram for another further example of modifying a stereoscopic image in a mobile terminal according to the second embodiment.

Referring to FIG. 28, while an image including a 3-dimensionally projected and displayed stereoscopic object is being displayed [S1101], the mobile terminal 100 receives an input of a touch action corresponding to a virtual display plane on which the stereoscopic object is displayed.

Accordingly, until a 3D display extent of a region 21, on which the corresponding stereoscopic object is displayed, becomes equal to that of other regions 22a and 22b enclosing the stereoscopic object, the controller 180 is able to display the corresponding region 21 in a manner that the corresponding region 21 becomes recessed gradually.

After the stereoscopic object displayed region 21 has been recessed in a manner that the 3D display extent of the stereoscopic object displayed region 21 becomes equal to that of the rest regions 22a and 22b [S1102], the stereoscopic object displayed region 21 further becomes recessed gradually and the regions 22a and 22b enclosing the corresponding region 21 may further ascend gradually [S1103].

Afterwards, if the touch action is removed from the stereoscopic object, the controller 180 reconstructs the stereoscopic image into the state before the input of the touch action [S1104, S1105]. In particular, the stereoscopic object displayed region 21 is projected into the state before the input of the touch action and the regions 22a and 22b enclosing the corresponding region 21 can be receded into the state before the input of the touch action.

Figure 29:
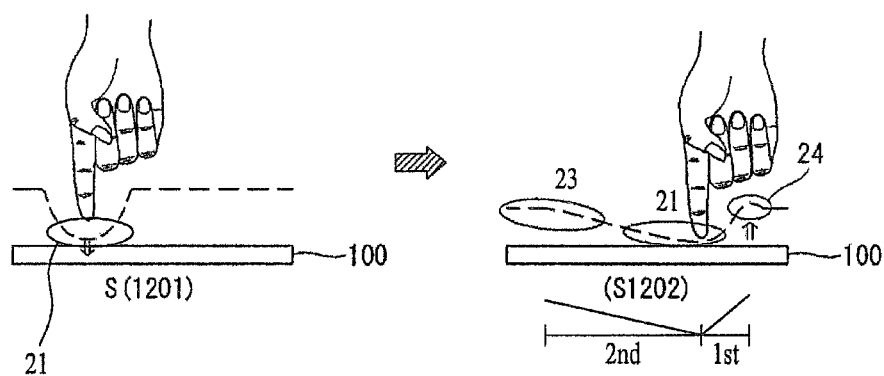

FIG. 29 is a diagram for another further example of modifying a stereoscopic image in a mobile terminal according to the second embodiment.

Referring to FIG. 29, while a stereoscopic image is being displayed on the touchscreen, if a prescribed point is touched, the mobile terminal 100 is able to control the touchscreen to display a partial region 21 including the touched point in a manner of recessing the partial region 21 [S1201, S1202]. In particular, in a manner of descending the region 21 including a point, to which a touch & drag action is currently inputted, in a virtual display plane and ascending a region 23 including a point, to which a touch & drag action was previously inputted, gradually, a state before the input of the touch & drag action is finally reconstructed. Moreover, the controller 180 is able to project and display a region 24 including an estimated point, to which a touch & drag action will be possibly inputted.

For example, if the touch input at the prescribed point is a touch & drag input moved in a first direction, the partial region 21 may be moved to correspond to the movement of the touch & drag input. During the movement of the touch input, the shape of the recessed portion of the image may be changed based on the movement. For example, a first distance between the position of the moving input and a leading edge of the recessed portion of the image (a region adjacent to region 24 in the direction of the movement of the touch & drag input) may be less than a distance between the position of the moving input and a trailing edge of the recessed portion of the image at region 23. Hence, the recessed portion of the image may appear stretched corresponding to the movement of the touch & drag input. The amount in which the shape of the recessed portion may change can be based on the speed of the movement, for example. As shown in FIG. 29, the slope (angle) of the recessed image in the path of the touch & drag input positioned prior to the input may be greater than the slope of the recessed image in the path of the input after the input. The relative angles of incline at various portions of the recessed portion of the image may correspond to the movement of the input and associated distances between the location of the input pointer and the outer edges of the recessed image (e.g., regions 23, 24).

Accordingly, in case of inputting a touch & drag action using a finger or the like, a user is able to observe a stereoscopic effect. In this case, a stereoscopic image look as if pushed with reference to the point touched by the touch & drag action.

Figure 30:
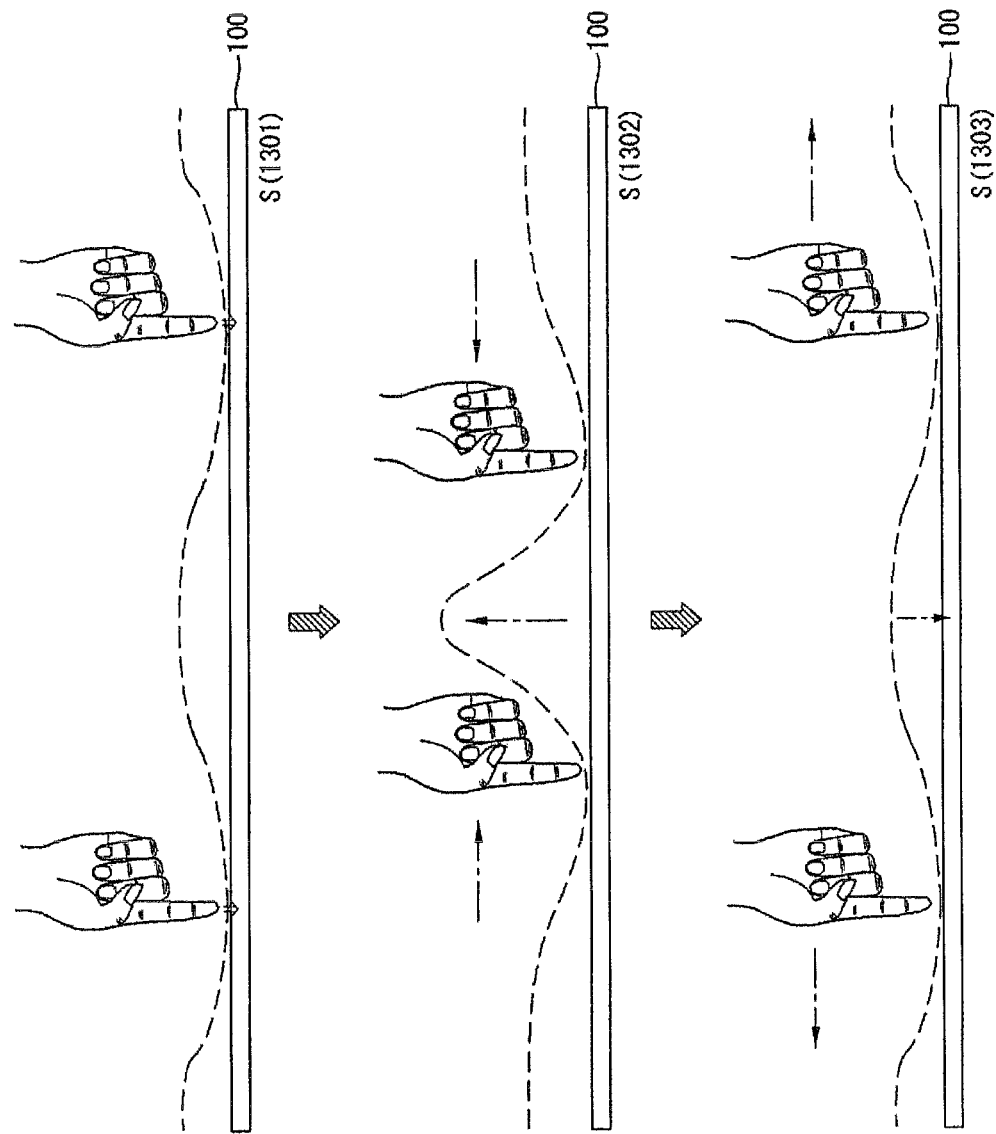

FIG. 30 is a diagram for another further example of modifying a stereoscopic image in a mobile terminal according to the second embodiment.

Referring to FIG. 30, while a stereoscopic image is being displayed on the touchscreen, the mobile terminal 100 receives an input of a touch action by a multi-touch [S1301].

Afterwards, if a drag action is performed in a direction for enabling two multi-touched points get closer to each other, the controller 180 is able to implement a stereoscopic view enabling a stereoscopic view image to look as if folded in the drag direction [S1302]. In this case, the controller 180 implements the stereoscopic view in a manner that a virtual display plane of the stereoscopic image forms a curved surface to ascend gradually if the two multi-touched points get closer to each other, thereby providing a stereoscopic effect having the stereoscopic image look as if folded.

Moreover, after the stereoscopic view, which enables a stereoscopic view image to look as if folded in the drag direction, has been implemented, if a drag action enabling the two multi-touched points to get more distant from each other is performed, the controller 180 is able to implement a stereoscopic view enabling the stereoscopic image to be unfolded. In particular, the controller 180 is able to implement the stereoscopic view in which the state before folding the stereoscopic image is gradually reconstructed [S1303].

Figure 31:
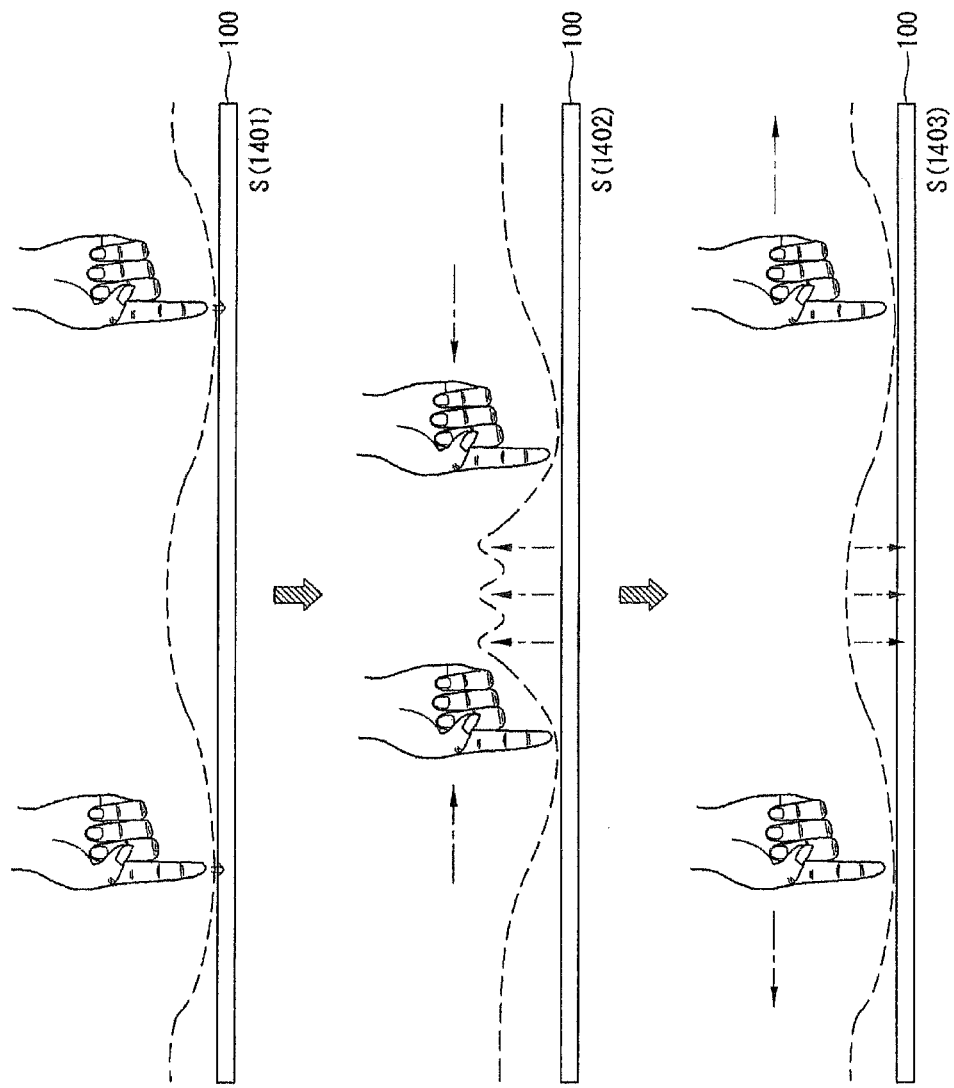

FIG. 31 is a diagram for another further example of modifying a stereoscopic image in a mobile terminal according to the second embodiment.

Referring to FIG. 31, while a stereoscopic image is being displayed on the touchscreen, the mobile terminal 100 receives an input of a touch action by a multi-touch [S1401].

Afterwards, if a drag action is performed in a direction for enabling two multi-touched points to move closer to each other, the controller 180 is able to implement a stereoscopic view enabling a stereoscopic view image to look as if a stereoscopic view image is folded in the drag direction [S1402]. In this case, the controller 180 implements the stereoscopic view in a manner that the stereoscopic image displayed between the two multi-touched points is wrinkled.

Moreover, after the stereoscopic view, which enables a stereoscopic view image to look as if wrinkled in the drag direction, has been implemented, if a drag action enabling the two multi-touched points to get farther from each other is performed, the controller 180 is able to implement a stereoscopic view enabling the stereoscopic image to be unwrinkled again. In particular, the controller 180 is able to implement the stereoscopic view in which the state before folding the stereoscopic image is gradually reconstructed [S1403].

In the following description, an image display controlling method of a mobile terminal according to a third embodiment is explained in detail with reference to FIGS. 32 to 34.

Figure 32:
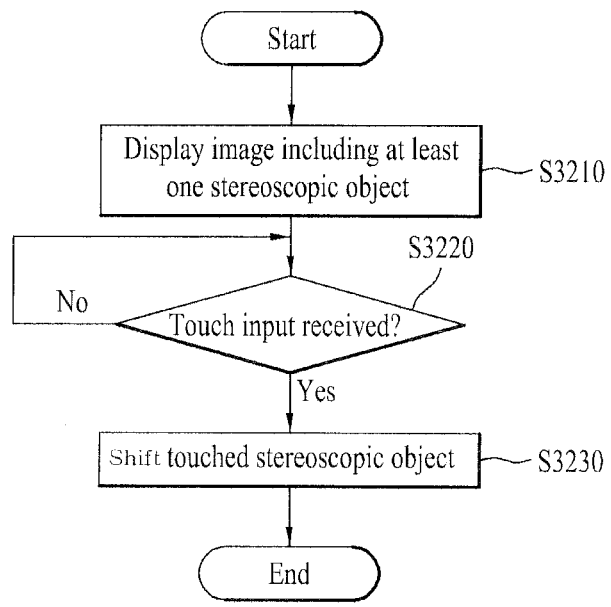
FIG. 32 is a flowchart of an image display controlling method of a mobile terminal according to a third embodiment.

FIG. 32 is a flowchart of an image display controlling method of a mobile terminal according to the third embodiment of the present disclosure.

Referring to FIG. 32, the mobile terminal 100 displays an image including at least one or more stereoscopic objects under the control of the controller 180 [S3210].

Figure 33A:
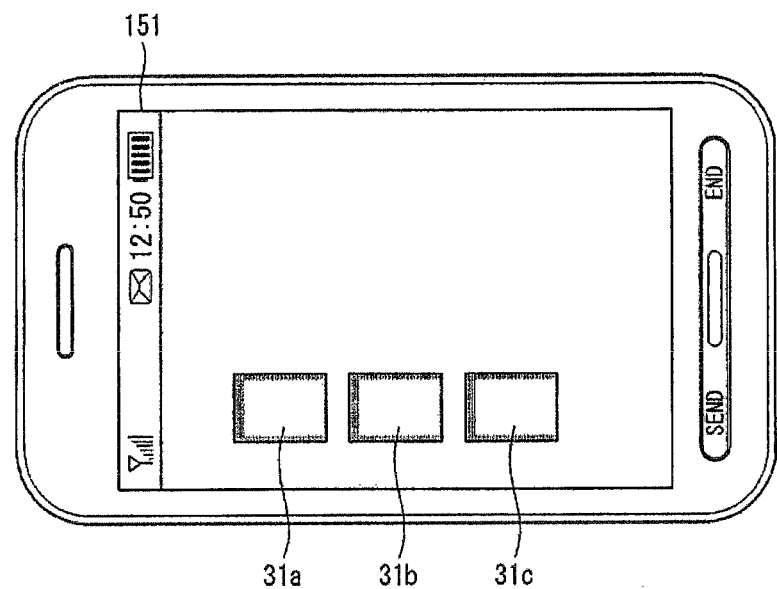
FIGS. 33A and 33B are diagrams illustrating a display of a stereoscopic object according to a third embodiment.
Figure 33B:
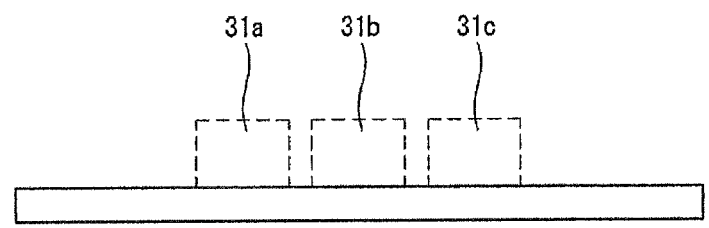

For instance, referring to FIGS. 33A and 33B, stereoscopic objects 31a, 31b and 31c can be displayed within the image in a manner of being projected.

In case of receiving an input of a touch action performed on a specific one of the at least one or more stereoscopic objects [S3220], the mobile terminal 100 shifts and displays the specific stereoscopic object corresponding to the touch action [S3230].

Figure 34:
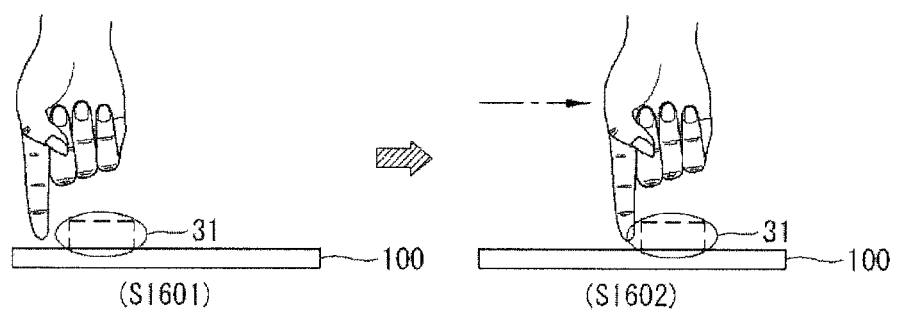
FIG. 34 is a diagram for one example of moving a stereoscopic object to display according to a third embodiment.

FIG. 34 is a diagram for one example of shifting a stereoscopic object to display according to the third embodiment.

Referring to FIG. 34, while a stereoscopic object is projected and displayed [S1601], the controller 180 receives an input of a touch & drag action proceeding in to a region 31 on which the stereoscopic object is displayed.

Therefore, the controller 180 is able to display the stereoscopic object in a manner of shifting the stereoscopic object in the drag direction [S1602]. In this case, the controller 180 is able to differently control a shift distance or speed of the stereoscopic object based on a drag speed. For instance, if the drag speed gets higher, the controller 180 is able to shift the stereoscopic objects a greater distance. Moreover, if the drag speed gets higher, the controller 180 is able to control the shift speed of the stereoscopic object to become faster.

According to one embodiment of the present disclosure, the above-described image display controlling methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The present application or patent is directed to a mobile terminal and image display controlling method thereof that substantially obviate one or more problems due to limitations and disadvantages of the related art.

An object of the present disclosure is to provide a mobile terminal and image display controlling method thereof. In particular, when a switching operation between 2D display and 3D display is performed, a gradual change of a projected or recessed extent of an image in the course of the switching operation may be provided.

Additional advantages, objects, and features of the disclosure as set forth in part in the description and in part will become apparent to those having ordinary skill in the art upon examination of the disclosure or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a mobile terminal according to the present disclosure may include a display unit that displays an image including at least one or more objects, a user input unit that receives a switching command action for switching a 2D display and a 3D display to each other, and a controller configured to perform a switching operation between the 2D display and the 3D display to correspond to the inputted switching command action, the controller controlling the display unit to sequentially display at least one intermediate image to gradually project/recess and display a prescribed one of the at least one or more objects in the course of performing the switching operation.

In this embodiment, the at least one intermediate image may include the at least one or more objects and may have a sequential projected or recessed extent of the prescribed object. The switching command action may include an action of inclining the mobile terminal in a predetermined direction by a prescribed angle and the 3D display may include at least one of a 3D projected display or a 3D recessed display.

In case of performing the switching operation from the 2D display to the 3D projected display, the display unit may sequentially display the at least one intermediate image in order of increasing a projected extent of the prescribed object under the control of the controller. In case of performing the switching operation from the 2D display to the 3D recessed display, the display unit may sequentially display the at least one intermediate image in order of increasing a recessed extent of the prescribed object under the control of the controller. In case of performing the switching operation from the 3D projected display to the 2D display, the display unit may sequentially display the at least one intermediate image in order of decreasing a projected extent of the prescribed object under the control of the controller. Moreover, in case of performing the switching operation from the 3D recessed display to the 2D display, the display unit may sequentially display the at least one intermediate image in order of decreasing a recessed extent of the prescribed object under the control of the controller.

Furthermore, in case of performing the switching operation from the 2D display to the 3D display, the controller may set a projected or recessed extent of the prescribed object displayed in the course of performing the switching operation to be smaller than the projected or recessed extent of the prescribed object displayed at the completion of the switching operation. The projected or recessed extent of the prescribed object included in a specific one of the at least one intermediate image may be set to be greater than the projected or recessed extent of the prescribed object displayed at the completion of the switching operation. In case of performing the switching operation from the 3D display to the 3D display, the controller may set a projected or recessed extent of the prescribed object displayed in the course of performing the switching operation to be greater than the projected or recessed extent of the prescribed object displayed at the completion of the switching operation.

Moreover, the controller may set a slope of the projected or recessed extent of the prescribed object included in each of the at least one image for a progress time of the switching operation to be constant or become gradually steeper. The user input unit receives an input of a selection action of the number of the at least one intermediate image and an input of a selection action of a projected or recessed extent of each of the at least one intermediate image and wherein the controller sets the number and the projected or recessed extent of the at least one intermediate image to correspond to the inputted selection actions.

The display unit may include a touchscreen, wherein the touchscreen receives a touch action on a first point of the displayed image, wherein the controller obtains a first region including the first point and controls the touchscreen to display the obtained first region in a manner that the obtained first region is gradually recessed, wherein the first region may include the prescribed one of the at least one or more objects, the prescribed one including the first point. The controller may set recessed extents of a plurality of pixels included in the first region to be different according to a distance from the first point.

Moreover, the controller may obtain a second region located at a periphery of the first region and wherein the controller controls the touchscreen to display the second region in a manner that the second region is gradually projected to correspond to a gradually recessed display of the first region. The controller may set projected extents of a plurality of pixels included in the second region to be different according to a distance from the first region. If the touch action is removed from the first point, the controller may reconstruct the recessed display of the first region into a state before the input of the touch action. If the touch action on the first point is a touch & drag action, the controller may control the touchscreen to gradually recessed display the first region to correspond to a drag path.

In this embodiment, if the first point is a current touch point by the touch & drag action, the first region may include a second region including the current touch point, and wherein, if the current touch point gets closer to the first point, the controller may set a recessed extent of the second region to gradually increase higher. The first region may be a neighbor to the second region, wherein the first region may include a third region including at least one previous touch point by the touch & drag action, and wherein, if the current touch point gets closer to the first point, the controller may set a recessed extent of the third region to be gradually reconstructed into a state before the input of the touch & drag action.

The controller may obtain a fourth region including at least one point estimated to be touched by the touch & drag action, wherein the fourth region may be a neighbor to the second region, and wherein, if the first region is touched, the controller may set a projected extent of the fourth region to be greater than that of the touch to the first point.

In another aspect of the present application or patent, a method of controlling an image display in a mobile terminal according to the present disclosure may include the steps of displaying an image including at least one or more objects, receiving a switching command action for switching a 2D display and a 3D display to each other, performing a switching operation between the 2D display and the 3D display to correspond to the inputted switching command action, and sequentially displaying at least one intermediate image to gradually project/recess and display a prescribed one of the at least one or more objects in the course of performing the switching operation.

The 3D display may include at least one of a 3D projected display and a 3D recessed display. The intermediate image displaying step may include, if performing the switching operation from the 2D display to the 3D projected display, sequentially displaying the at least one intermediate image in order of increasing a projected extent of the prescribed object; and, if performing the switching operation from the 2D display to the 3D recessed display, sequentially displaying the at least one intermediate image in order of increasing a recessed extent of the prescribed object.

The intermediate image displaying step may include, if performing the switching operation from the 3D projected display to the 2D display, sequentially displaying the at least one intermediate image in order of decreasing a projected extent of the prescribed object; and, if performing the switching operation from the 3D recessed display to the 2D display, sequentially displaying the at least one intermediate image in order of decreasing a recessed extent of the prescribed object.

The method may further include, if performing the switching operation from the 2D display to the 3D display, setting a projected or recessed extent of the prescribed object displayed in the course of performing the switching operation to be smaller than the projected or recessed extent of the prescribed object displayed at the completion of the switching operation. Moreover, if performing the switching operation from the 3D display to the 2D display, the method may include setting a projected or recessed extent of the prescribed object displayed in the course of performing the switching operation to be greater than the projected or recessed extent of the prescribed object displayed at the completion of the switching operation. Furthermore, the method may further include receiving a touch action on a first point of the displayed image; obtaining a first region including the first point; and displaying the obtained first region in a manner that the obtained first region is gradually recessed.

In one embodiment, a display module for a mobile terminal, as broadly embodied and described herein, may include a display for displaying an image that includes one or more objects; a user input interface to receive an input to change the image between a 2D display and a 3D display; and a controller configured to change the displayed image between the 2D display and the 3D display based on the received input, the controller controlling the display to sequentially display one or more intermediate images to gradually change an extent in which at least one of the one or more objects is perceived to protrude or recede into the display during the change in the displayed image.

The one or more intermediate images may include the at least one of the objects, wherein the at least one of the objects displayed in the one or more intermediate images may be configured to be perceived to protrude or recede by an intermediate amount. The input may be a rotation of the mobile terminal in a predetermined direction by a prescribed angle. The 3D display may include at least one of a 3D projected display or a 3D recessed display.

In this embodiment, when changing the displayed image from the 2D display to the 3D projected display, the one or more intermediate image may be sequentially displayed according to an increasing extent in which the at least one object is perceived to protrude. When changing the displayed image from the 2D display to the 3D recessed display, the one or more intermediate images may be sequentially displayed according to an increasing extent in which the at least one object is perceived to recede into the display. When changing the displayed image from the 3D projected display to the 2D display, the one or more intermediate image may be sequentially displayed according to a decreasing extent in which the at least one object is perceived to protrude. When changing the displayed image from the 3D recessed image to the 2D image, the one or more intermediate image may be sequentially displayed according to a decreasing extent in which the at least one object is perceived to recede into the display.

Moreover, when changing the displayed image from the 2D display to the 3D display, the controller may control a display of the at least one object in a first intermediate image to protrude or recede by an amount less than in the 3D display. The controller may also control a display of the at least one object in a second intermediate image to protrude or recede by an amount greater than in the 3D image. When changing the displayed image from the 3D display to a second 3D display, the prescribed object displayed in the intermediate image may be configured to protrude or recede more than the at least one object displayed in the second 3D display.

The controller may be configured to control a rate of change in the extent in which the at least one of the objects is perceived to protrude or recede into the display during a prescribed period of time for changing the displayed image, the rate of change being controlled to be constant or to gradually increase during the prescribed period of time. The controller may also control a number of the intermediate images to be displayed during the change in the displayed image and the extent in which the at least one object in each of the intermediate images protrudes or recedes.

In this embodiment, the display may include a touchscreen configured to receive a touch input at a first point of the displayed image. The controller may be configured to define a first region of the displayed image that includes the first point and to change the display of the image in the first region to be gradually recessed. The touch input may be a selection of the at least one of the one or more objects, and the first region may include the at least one of the objects. The image in the first region may include a plurality of pixels, wherein the controller may control an extent in which the plurality of pixels are recessed such that the extent of recess of each pixel is reduced with increased distance from the first point.

Moreover, the controller may define a second region that surrounds the first region, the image in the second region displayed to gradually protrude corresponding to the extent in which the image in the first region is recessed. The image in the second region may include a plurality of pixels. The controller may control an extent in which the plurality of pixels in the second region protrudes such that the extent of protrusion of each pixel is reduced with increased distance from the first region. If the touch input is removed from the first point, the image displayed in the first region may be restored to a state prior to the touch input.

In this embodiment, if the touch input at the first point is a touch & drag input in a first direction, the first region may be moved in the first direction corresponding to a movement of the touch & drag input. During the movement of the touch input, a first distance between a position of the touch input and a leading edge of the first region may be configured to be less than a second distance between the position of the touch input and a trailing edge of the first region, the leading edge positioned in the direction of the movement and the trailing edge positioned opposite the direction of the movement. Moreover, the image in the first region adjacent to the leading edge may be recessed at a first angle and the image in the first region adjacent to the trailing edge is recessed at a second angle, the first and second angles corresponding to the first and second distances.

The image displayed at the first point may be gradually restored to a previous state as the first region is moved away from the first point. A second region may be positioned adjacent to the first region at the leading edge of the first region, wherein the image displayed in the second region is configured to be perceived to protrude relative to the movement of the touch input.

In one embodiment, a method of controlling a display in a mobile terminal, may include displaying an image that includes one or more objects; receiving an input to change the displayed image between a 2D display and a 3D display; and changing the displayed image between the 2D display and the 3D display, wherein the changing the displayed image includes sequentially displaying one or more intermediate images to gradually change an extent in which at least one of the one or more objects is perceived to protrude or recede into the display during the change in the displayed image.

The 3D display may include at least one of a 3D projected display and a 3D recessed display. The sequentially displaying the one or more intermediate images may include, when changing the displayed image from the 2D display to the 3D projected display, sequentially displaying the one or more intermediate images according to an increasing extent in which the at least one object is perceived to protrude. Moreover, this method may include, when changing the displayed image from the 2D display to the 3D recessed display, sequentially displaying the one or more intermediate images according to an increasing extent in which the at least one object is perceived to recede into the display.

The sequentially displaying the one or more intermediate images may include, when changing the displayed image from the 3D projected display to the 2D display, sequentially displaying the one or more intermediate images according to a decreasing extent in which the at least one object is perceived to protrude; and, when changing the displayed image from the 3D recessed display to the 2D display, sequentially displaying the one or more intermediate images according to a decreasing extent in which the at least one object is perceived to recede into the display.

The method may further include, when changing the displayed image from the 2D display to the 3D display, setting the extent in which the at least one object in the one or more intermediate images is displayed to protrude or recede to be less than in the 3D display. Moreover, the method may include, when changing the displayed image from the 3D display to the 2D display, setting the extent in which the at least one object in the one or more intermediate images is displayed to protrude or recede to be greater than in the 2D display. Additionally, the method may further include receiving a touch input at a first point of the displayed image; defining a first region of the displayed image that includes the first point; and displaying the image in the first region to be gradually recessed.

In one embodiment, a display module for a mobile terminal may include a display for displaying 3D images; an input interface; and a controller configured to gradually change a portion of a displayed image between a 3D image and a 2D image, wherein an area of the image may be defined based on an input at the input interface, and a perceived 3-dimensional depth of the image displayed in the first area may be gradually changed during a prescribed period of time, wherein the perceived 3-dimensional depth may be gradually increased when changing the portion of the displayed image from the 2D image to the 3D image, and the perceived 3-dimensional depth of the image in the first area may be gradually decreased when changing the portion of the displayed image from the 3D image to the 2D image.

In one embodiment, a method of displaying a 3D image on a mobile terminal may include displaying an image on a touch screen display; receiving a selection of the image to change a 3D display characteristic for a portion of the image; defining an area of the image based on the received selection; and gradually changing a perceived 3-dimensional depth of the image displayed in the defined area, wherein the perceived 3-dimensional depth of the image is changed a prescribed number of times within a prescribed period of time.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display module for a mobile terminal, comprising:
a display for displaying an image that includes one or more objects;
a motion sensor configured to sense rotation of the mobile terminal, the sensed rotation corresponding to a switching command to change the image displayed on the display between a 2D image and a 3D image; and
a controller configured to change the image between the 2D image and the 3D image based on the received switching command, the controller controlling the display to sequentially display one or more intermediate images to gradually change an extent in which the image is perceived to protrude from or recede into the display during the change in the image, wherein the extent in which the image is perceived to protrude from or recede into the display as the rotation of the mobile terminal is sensed corresponds to a degree of rotation of the mobile terminal sensed by the motion sensor, and wherein a pre-determined extent in which the image is perceived to protrude from or recede into the display is previously set for the 3D image, and
wherein, response to the switching command, the controller is configured to control the display to sequentially display the one or more intermediate images including a first intermediate image that protrudes or recedes by a first amount that is less than the pre-determined extent set for the 3D image, the first amount corresponding to a first amount of rotation of the mobile terminal, and then a second intermediate image that protrudes or recedes by a second amount that is greater than the pre-determined extent set for the 3D image, the second amount corresponding to a second amount of rotation of the mobile terminal, prior to displaying the 3D image at the predetermined extent set for the 3D image.

2. The display module of claim 1, wherein the one or more intermediate images include at least one of the one or more objects, the at least one of the one or more objects displayed in the one or more intermediate images being configured to be perceived to protrude or recede by an intermediate amount.

3. The display module of claim 1, wherein, when changing the displayed image from the 2D image to the 3D projected image, the one or more intermediate image is sequentially displayed according to an increasing extent in which the at least one object is perceived to protrude.

4. The display module of claim 1, wherein, when changing the displayed image from the 2D image to the 3D recessed image, the one or more intermediate images are sequentially displayed according to an increasing extent in which the at least one object is perceived to recede into the display.

5. The display module of claim 1, wherein, when changing the displayed image from the 3D projected image to the 2D image, the one or more intermediate image is sequentially displayed according to a decreasing extent in which the at least one object is perceived to protrude.

6. The display module of claim 1, wherein, when changing the displayed image from the 3D recessed image to the 2D image, the one or more intermediate image is sequentially displayed according to a decreasing extent in which the at least one object is perceived to recede into the display.

7. The display module of claim 1, wherein, when changing the displayed image from the 3D image to a second 3D image, a prescribed object displayed in at least one of the one or more intermediate images is configured to protrude or recede more than the at least one object displayed in the second 3D image.

8. The display module of claim 1, wherein the controller is configured to control a rate of change in the extent in which the at least one of the objects is perceived to protrude or recede into the display during a prescribed period of time for changing the displayed image, the rate of change being controlled to be constant or to gradually increase during the prescribed period of time.

9. The display module of claim 1, wherein the controller controls a number of the intermediate images to be displayed during the change in the displayed image and the extent in which the at least one object in each of the intermediate images protrudes or recedes.

10. The display module of claim 1, wherein the display includes a touchscreen configured to receive a touch input at a first point of the displayed image, and wherein the controller is configured to define a first region of the displayed image that includes the first point and to change the display of the image in the first region to be gradually recessed.

11. The display module of claim 10, wherein the touch input is a selection of the at least one of the one or more objects, and the first region includes the at least one of the one or more objects.

12. The display module of claim 10, wherein the image in the first region includes a plurality of pixels, and wherein the controller controls an extent in which the plurality of pixels are recessed such that the extent of recess of each pixel is reduced with increased distance from the first point.

13. The display module of claim 10, wherein the controller defines a second region that surrounds the first region, the image in the second region displayed to gradually protrude corresponding to the extent in which the image in the first region is recessed.

14. The display module of claim 13, wherein the image in the second region includes a plurality of pixels, and wherein the controller controls an extent in which the plurality of pixels in the second region protrudes such that the extent of protrusion of each pixel is reduced with increased distance from the first region.

15. The display module of claim 10, wherein, if the touch input is removed from the first point, the image displayed in the first region is restored to a state prior to the touch input.

16. The display module of claim 10, wherein, if the touch input at the first point is a touch & drag input in a first direction, the first region is moved in the first direction corresponding to a movement of the touch & drag input.

17. The display module of claim 16, wherein, during the movement of the touch input, a first distance between a position of the touch input and a leading edge of the first region is less than a second distance between the position of the touch input and a trailing edge of the first region, the leading edge positioned in the direction of the movement and the trailing edge positioned opposite the direction of the movement, and wherein
the image in the first region adjacent to the leading edge is recessed at a first angle and the image in the first region adjacent to the trailing edge is recessed at a second angle, the first and second angles corresponding to the first and second distances.

18. The display module of claim 17, wherein the image displayed at the first point is gradually restored to a previous state as the first region is moved away from the first point.

19. The display module of claim 17, wherein a second region is positioned adjacent to the first region at the leading edge of the first region, wherein the image displayed in the second region is configured to be perceived to protrude relative to the movement of the touch input.

20. A method of controlling a display in a mobile terminal, comprising:
displaying an image that includes one or more objects;
receiving a switching command to change the displayed image between a 2D image and a 3D image, the switching command being sensed by a motion sensor configured to sense motion of the mobile terminal, the sensed motion being a rotation of the mobile terminal corresponding to the switching command to change the displayed image; and
changing the displayed image between the 2D image and the 3D image, wherein changing the displayed image includes sequentially displaying one or more intermediate images to gradually change an extent in which at least one of the one or more objects is perceived to protrude from or recede into the display during the change in the displayed image, a pre-determined extent in which the image is perceived to protrude from or recede into the display being previously set for the 3D image,
wherein sequentially displaying the one or more intermediate images when changing the displayed image from the 2D image to the 3D image comprises sequentially displaying a first intermediate image and then a second intermediate image prior to displaying the 3D image, and wherein
displaying a first intermediate image comprises displaying the first intermediate image such that the first intermediate image protrudes or recedes by a first amount that is less than the pre-determined extent set for the 3D image, the first amount corresponding to a first amount of rotation of the mobile terminal, and displaying a second intermediate image comprises displaying the second intermediate image such that the second intermediate image protrudes or recedes by a second amount that is greater than the pre-determined extent set for the 3D image, the second amount corresponding to a second amount of rotation of the mobile terminal.

21. The method of claim 20, wherein the 3D image includes at least one of a 3D projected image or a 3D recessed image.

22. The method of claim 21, wherein the sequentially displaying the one or more intermediate images includes:
when changing the displayed image from the 3D projected image to the 2D image, sequentially displaying the one or more intermediate images according to a decreasing extent in which the at least one object is perceived to protrude; and
when changing the displayed image from the 3D recessed image to the 2D image, sequentially displaying the one or more intermediate images according to a decreasing extent in which the at least one object is perceived to recede into the display.

23. The method of claim 20, further comprising:
when changing the displayed image from the 2D image to the 3D image, setting the extent in which the at least one object in the one or more intermediate images is displayed to protrude or recede to be less than in the 3D image.

24. The method of claim 20, further comprising:
when changing the displayed image from the 3D image to the 2D image, setting the extent in which the at least one object in the one or more intermediate images is displayed to protrude or recede to be greater than in the 2D image.

25. The method of claim 20, further comprising:
receiving a touch input at a first point of the displayed image;
defining a first region of the displayed image that includes the first point; and
displaying the image in the first region to be gradually recessed.

26. The display module of claim 1, wherein the intermediate images are generated based on a rotation angle of the mobile terminal sensed by the motion sensor.

27. The display module of claim 1, wherein the extent in which the at least one of the one or more objects is perceived to protrude or recede varies in a non-linear manner with a rotation angle of the mobile terminal.

28. The display module of claim 27, wherein the motion sensed by the motion sensor corresponding to the input to change the image between the 2D image and the 3D image is a rotation of the mobile terminal about an axis of rotation that is orthogonal to the display.

29. A display unit for a mobile terminal, comprising:
a display for displaying an image that includes one or more objects;
an input interface to receive switching command to change the image displayed on the display between a 2D image and a 3D image; and
a controller configured to change the image between the 2D image and the 3D image in response to the received switching command, the controller controlling the display to sequentially display one or more intermediate images to gradually change an extent to which the image is perceived to protrude from or recede into the display as the displayed image is changed, wherein the one or more intermediate images include at least one of the one or more objects, the at least one of the one or more objects of the one or more intermediate images perceived to protrude from or recede into the display by an intermediate amount, wherein a pre-determined extent in which the image is perceived to protrude from or recede into the display is previously set for the 3D image, and wherein, when changing the displayed image from the 2D image to the 3D image, the controller controls a display of a first intermediate image to protrude or recede by a first amount that is less than the pre-determined extent set for the 3D image, the first amount corresponding to a first orientation of the mobile terminal, and controls a display of a second intermediate image to protrude or recede by a second amount that is greater than the pre-determined extent set for the 3D image, the second amount corresponding to a second orientation of the mobile terminal, prior to displaying the 3D image.

* * * * *